US012650517B2

(12) United States Patent
Brenner et al.

(10) Patent No.: US 12,650,517 B2
(45) Date of Patent: Jun. 9, 2026

(54) MULTISPECTRAL EMISSION DEVICE FOR VEHICLES FOR EMITTING VISIBLE LIGHT, LiDAR AND RADAR RADIATION, AND METHOD AND USE THEREOF

(71) Applicant: Fraunhofer-Gesellschaft zur Förderung angewandten Forschung e. V., Munich (DE)

(72) Inventors: Andreas Brenner, Aachen (DE); Ludwig Pongratz, Aachen (DE); Arnold Gillner, Aachen (DE); Thomas Dallmann, Aachen (DE); Tim Freialdenhoven, Aachen (DE); Kerstin Täschner, Dresden (DE); Thomas Preussner, Dresden (DE); Peter Schreiber, Jena (DE); Dmitrii Stefanidi, Jena (DE); Jennifer Ruskowski, Duisburg (DE); Sara Weyer, Dortmund (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 76 days.

(21) Appl. No.: 18/709,182

(22) PCT Filed: Nov. 11, 2022

(86) PCT No.: PCT/EP2022/081678
§ 371 (c)(1),
(2) Date: May 10, 2024

(87) PCT Pub. No.: WO2023/084057
PCT Pub. Date: May 19, 2023

(65) Prior Publication Data
US 2025/0004139 A1    Jan. 2, 2025

(30) Foreign Application Priority Data

Nov. 12, 2021    (DE) ..................... 10 2021 129 622.6

(51) Int. Cl.
G01S 17/931        (2020.01)
B60Q 1/00        (2006.01)
        (Continued)

(52) U.S. Cl.
CPC .......... G01S 17/931 (2020.01); B60Q 1/0023 (2013.01); G01S 7/4813 (2013.01);
        (Continued)

(58) Field of Classification Search
CPC .... G01S 17/931; G01S 7/4813; G01S 7/4815; G01S 7/4816; G01S 7/4817;
        (Continued)

(56) References Cited

U.S. PATENT DOCUMENTS

| | | | |
|---|---|---|---|
| 5,868,488 A | 2/1999 | Speak et al. | |
| 11,421,846 B2 | 8/2022 | Schreiber et al. | |
| (Continued) | | | |

FOREIGN PATENT DOCUMENTS

| | | |
|---|---|---|
| DE | 19731754 A1 | 2/1999 |
| DE | 102017116597 A1 | 1/2019 |
| (Continued) | | |

*Primary Examiner* — Anne Marie Antonucci
*Assistant Examiner* — Luis G Del Valle
(74) *Attorney, Agent, or Firm* — The Webb Law Firm

(57) ABSTRACT

A multispectral emission device includes at least one transmitting unit for LiDAR radiation, one receiving unit for LiDAR radiation, and at least a LiDAR radiation manipulating device, and a radar radiation manipulating device. The LiDAR radiation manipulating device and the transmitting unit for LiDAR-S are arranged such that the LiDAR radiation manipulating device redirects LiDAR radiation emitted by the transmitting unit for LiDAR radiation and the LiDAR (Continued)

radiation manipulating device is set up such that LiDAR radiation passing through the headlight cover from the outside is guided to the receiving unit for LiDAR radiation. The radar radiation manipulating device is set up such that radar radiation passing through the headlight cover from the outside is guided to the receiving unit for radar radiation. The transmitting unit for LiDAR radiation, the LiDAR radiation manipulating device, the radar module, and the radar radiation manipulating device are arranged such that at least one radiation cone of diverted LiDAR radiation and at least one radiation cone of diverted radar radiation are aligned.

23 Claims, 10 Drawing Sheets

(51) Int. Cl.

| | |
|---|---|
| *G01S 7/481* | (2006.01) |
| *G01S 13/86* | (2006.01) |
| *G01S 13/931* | (2020.01) |
| *G01S 17/42* | (2006.01) |
| *G01S 17/894* | (2020.01) |

(52) U.S. Cl.

CPC .......... *G01S 7/4815* (2013.01); *G01S 7/4816* (2013.01); *G01S 7/4817* (2013.01); *G01S 13/865* (2013.01); *G01S 13/931* (2013.01); *G01S 17/42* (2013.01); *G01S 17/894* (2020.01); *G01S 2013/93277* (2020.01)

(58) Field of Classification Search

CPC ...... G01S 13/865; G01S 13/931; G01S 17/42; G01S 17/894; G01S 2013/93277; G01S 7/027; B60Q 1/0023; B60W 2420/408

See application file for complete search history.

(56) References Cited

U.S. PATENT DOCUMENTS

| | | | |
|---|---|---|---|
| 11,428,379 B2 | 8/2022 | Schreiber et al. | |
| 11,623,558 B2 | 4/2023 | Fushimi et al. | |
| 11,845,376 B2 | 12/2023 | Junghahnel | |
| 2007/0211484 A1 | 9/2007 | Marchal | |
| 2008/0158897 A1 | 7/2008 | Nakamura et al. | |
| 2019/0275923 A1* | 9/2019 | Fushimi | ................. G01S 17/87 |
| 2021/0387563 A1* | 12/2021 | Junghähnel | .......... H01Q 19/065 |
| 2021/0403015 A1* | 12/2021 | Kato | ..................... B60W 40/02 |

FOREIGN PATENT DOCUMENTS

| | | | |
|---|---|---|---|
| DE | 102018217213 A1 | 4/2020 | |
| DE | 102018217215 A1 | 4/2020 | |
| DE | 102018217774 A1 | 4/2020 | |
| EP | 3514576 A1 | 7/2019 | |
| WO | 2005090123 A1 | 9/2005 | |
| WO | 2020079060 A1 | 4/2020 | |

* cited by examiner

Thin glass uncoated ——— AR-6 on thin glass

600

Patch sizes adapted to the required phase position

MULTISPECTRAL EMISSION DEVICE FOR VEHICLES FOR EMITTING VISIBLE LIGHT, LiDAR AND RADAR RADIATION, AND METHOD AND USE THEREOF

CROSS-REFERENCE TO RELATED APPLICATIONS

This application is the United States national phase of International Patent Application No. PCT/EP2022/081678 filed Nov. 11, 2022, and claims priority to German Patent Application No. 10 2021 129 622.6 filed Nov. 12, 2021, the disclosures of which are hereby incorporated by reference in their entireties.

BACKGROUND OF THE INVENTION

Field of the Invention

The present invention relates to a multispectral emission device, in particular for vehicles, configured for emitting light and radar radiation and LiDAR radiation configured for detecting driving situations in a detection area by means of radar radiation and for detecting driving situations in a detection area by means of light radiation, in particular for the purpose of supporting the navigation of the vehicle. In particular, the invention also relates to a method for emitting light and radar radiation and for detecting at least reflected radar radiation. Last but not least, the present invention also relates to the use of the multispectral emission device for a large wave range of electromagnetic radiation over 4 orders of magnitude. In particular, the invention relates to a device and a method according to the general term of the respective independent claim.

Description of Related Art

For vehicle headlights in particular, attempts are already being made to create a combined device with integrated functionality for lighting as well as for radar and LiDAR radiation with a high level of practical suitability. Space requirements and robustness are important requirements when designing headlights, especially for vehicles. The combined use of light and radar radiation has proven to be particularly advantageous for the detection of relative positions in passenger transport. Driver assistance systems, such as adaptive distance control, lane departure warning systems and emergency braking systems, are now used across all vehicle classes, especially in passenger cars. However, such systems also provide benefits in the shipping and aviation industries and are already being used or at least trialed. Radar and LiDAR technology are particularly focused on different distance ranges and measurement situations for distance measurements, speed measurements and angle measurements. However, it is questionable at which position on the vehicle the radar technology and LiDAR technology should be sensibly positioned and possibly interact with other detection components. The conventional integration of radar technology in the bumper of a road vehicle harbors a high risk of damage, especially in the event of minor impacts or only slight contact between the vehicle and its surroundings. Integration in the radiator area, on the other hand, requires compromises in terms of vehicle design. Another challenge when integrating radar components into vehicles (especially cars), particularly in the front sections, is to compensate for attenuation of the transmit and receive signals on the individual material layers (especially on the bumper) and on the paint layers. Normally, artefacts and echo images in the radar signal must be eliminated. In other words, the exact evaluation of radar signals is not trivial due to the application. LiDAR systems, on the other hand, require an optically transparent radiation path to the environment and cannot be positioned behind opaque vehicle components such as a bumper. Solutions exist here to integrate the measuring systems into the radiator grille with transparent covers or to arrange the measuring systems behind the windscreen.

The applicant's international patent application WO 2020/079060 A1 discloses a multispectral emission device, in particular for vehicles, set up for emitting light and radar radiation and set up for detecting at least reflected radar radiation, with: a headlamp having a light-transparent headlamp cover and a light source arranged behind the headlamp cover; a radar module arranged behind the headlamp cover integrated in the headlamp and having a radar antenna unit, which is characterized in that the multispectral emission device has at least one radar radiation-manipulating device, in particular a frequency-selective radar radiation-manipulating device.

This known device has the advantage of optimizing the emission of light and radar radiation and the detection of reflected radiation by headlights, in particular for vehicles or motor vehicles. Furthermore, it realizes the emission of light and radar radiation and the detection of reflected radar radiation in such a way that both the light and radar radiation can be used in combination with each other in an integrated design in a common device for the navigation of a vehicle, in particular also with advantageous side effects with regard to design and space requirements or also with regard to the possible range of applications and also with regard to high reliability of the technology.

There is also a need to provide a sensor system with an extended wavelength spectrum, in particular multispectral wavelength ranges from visible light to millimeter waves.

Based on this state of the art, there is interest in an arrangement and a method for combined light radiation with an extended wavelength spectrum and with radar emission, which can achieve further advantages and further increase the benefits for road users.

The German patent application DE 10 2018 217 215 A1 of the applicant of the present patent application discloses a dipped beam headlamp with a light source arrangement for generating a light cone from light which is less divergent in the first transverse direction (y) than in a second transverse direction (x) perpendicular to the first transverse direction; a first, second and third lens array, which are arranged next to one another along the second transverse direction (x), in order to be irradiated on the input side in each case by an associated one of segments (12a, 12b, 12c) of the light cone (12) arranged next to one another in the second transverse direction and to emit on the output side dipped beam light (102) with a light intensity angle distribution which is modified with respect to the light cone (12).

The German patent application DE 10 2018 217 213 A1 of the applicant of the present patent application discloses a high beam headlamp comprising a light source array having a plurality of light sources; a honeycomb condenser; a collimator connected between the honeycomb condenser and the light source array for illuminating the honeycomb condenser with collimated light from the plurality of light sources, wherein the light source array comprises a first light source and at least one second light source, wherein the collimated light of the first light source of the light source array results in crosstalk-free transmission through the honeycomb condenser and illumination of a first far-field segment and, for each of the at least one second light source, the collimated light of the respective second light source results in transmission through the honeycomb condenser with channel crosstalk and illumination of a second far-field segment aligned obliquely to the first far-field segment.

SUMMARY OF THE INVENTION

The task is to provide a device and a method with which the emission of illumination light radiation, LiDAR radiation and radar radiation and the detection of reflected LiDAR and radar radiation by headlamps can be optimized, in particular for vehicles or motor vehicles. In particular, the task is to realize the emission of illumination light radiation, LiDAR radiation and radar radiation and the detection of reflected radiation in such a way that both the illumination light radiation, the LiDAR radiation and the radar radiation can be used in combination with each other in an integrated design in a common device for the navigation of a vehicle, in particular also with advantageous side effects with regard to design and space requirements or also with regard to the possible range of applications or also with regard to high reliability of the technology.

This task is solved by a multispectral emission device as described herein and by a method as described herein. Advantageous further embodiments of the invention are explained as described herein. The features of the embodiments described below can be combined with one another, unless this is explicitly negated.

According to the invention, a multispectral emission device is provided, in particular for vehicles, for example land vehicles, aircraft, ships and submarines, set up for emitting electromagnetic radiation and set up for detecting at least reflected radar radiation and reflected LiDAR radiation, having: a headlamp with a light-transparent headlamp cover and a light source arranged behind the headlamp cover; for visible light as headlamp light. According to the invention, a multispectral emission device, in particular for vehicles, is set up for emitting electromagnetic radiation and set up for detecting at least reflected radar radiation, having a headlamp with a light-transparent headlamp cover and a light source arranged behind the headlamp cover for emitting visible light as headlamp light; a radar module with a radar antenna unit arranged behind the headlamp cover and integrated in the headlamp, wherein the multispectral emission device (110) has at least one radiation-manipulating device, configured such that the multispectral emission device has at least one transmitting unit for LiDAR radiation and one receiving unit for LiDAR radiation and at least two radiation manipulators, wherein one of the radiation manipulators for LiDAR radiation is a LiDAR radiation manipulating device, at least one other of the radiation manipulators is a radar radiation manipulating device, the radiation manipulator for LiDAR radiation and the transmitting unit for LiDAR radiation being arranged such that the radiation manipulator for LiDAR radiation redirects LiDAR radiation emitted by the transmitting unit for LiDAR radiation, in that the radiation manipulator for LiDAR radiation is arranged in such a way that LiDAR radiation passing through the headlight cover from the outside is guided to the receiver unit for LiDAR radiation, and in that the radiation manipulator for radar radiation is arranged in such a way that radar radiation passing through the headlamp cover from the outside is guided to the receiving unit for radar radiation, and wherein the transmitting unit for LiDAR radiation, the radiation manipulator for LiDAR radiation, the radar module and the radiation manipulator for radar radiation are arranged in such a way that at least one radiation cone of the redirected LiDAR radiation and at least one radiation cone of the redirected radar radiation can be aligned with respect to one another.

According to the invention, radar and LiDAR sensors are integrated into the headlights, which guarantee optimum transmission for optical sensors and light sources as well as freedom from soiling. One or more LiDAR sensors (Light Detection And Ranging) work with a measuring principle that is based on determining the time between the emission of a laser pulse and the reception of the reflected light, and can thus measure distances very accurately and distinguish different objects from one another well.

One non-limiting embodiment of the multispectral emission device is characterized by the fact that at least one radiation cone of the redirected LiDAR radiation and at least one radiation cone of the redirected radar radiation can run parallel to each other, paraxially and/or coaxially or within overlapping radiation cones.

The at least partially coaxial beam guidance is advantageous in order to avoid a parallax error, which would otherwise have to be calculated out in a complicated manner.

A particularly useful further development of the multispectral emission device is characterized by the fact that at least one radiation cone of the redirected LiDAR radiation (104) and at least one radiation cone of the redirected radar radiation can additionally overlap.

This embodiment relates to the overlapping of a LiDAR and radar radiation cone, in particular to the overlapping of the LiDAR and radar radiation cones shown. The overlapping of a LiDAR and radar radiation cone has the following technical advantages in particular.

On the one hand, the higher sensor density made possible by this results in a more compact installation space. On the other hand, the wavelengths, which differ by several orders of magnitude, are combined in such a way that further detection possibilities are created, for example with regard to the movement of an object that reflects the signals relative to the multispectral emission device. This also ensures all-weather suitability for determining translational or rotational movement components of objects, in particular other vehicles or pedestrians. Furthermore, this ensures fast and precise determination of distances as well as speeds and accelerations.

This combines the insensitivity of radar radiation to rain and fog particularly well with the especially high resolution of LiDAR radiation.

A particularly expedient further development of the invention provides that the radiation cone of the headlamp light also runs coaxially to the radiation cones of the LiDAR and radar radiation. This ensures an overlapping common field of view as an overlapping common field of view (FOV), which simplifies the calibration of the LiDAR and radar systems in relation to each other for the joint detection of the same objects. The LiDAR and radar measurements can be recorded independently of each other and used for mutual validation or the data can be merged for an improved measurement, for example by using the measurement data from one system for improved settings and thus an improved measurement by the other system or by jointly analyzing the raw data from both systems.

Particularly advantageous embodiments of the invention enable a combination of wavelengths over 4 orders of magnitude from 400 nm to 4 mm.

The multispectral emission device preferably emits electromagnetic radiation in at least three wavelength ranges, in a non-limiting embodiment over four orders of magnitude.

An expedient further development of the invention provides that at least one radiation cone of the redirected LiDAR radiation, at least one radiation cone of the redirected radar radiation and a radiation cone of the headlamp light can run parallel to each other, paraxially and/or coaxially or overlapping.

One non-limiting embodiment of the multispectral emission device is characterized by the fact that at least one radiation cone of the redirected LiDAR radiation (104) and at least one radiation cone of the redirected radar radiation and at least one radiation cone of the headlight radiation can additionally run paraxially and/or overlap.

It is particularly useful to achieve three coaxialities: for at least one radiation cone of the redirected LiDAR radiation, at least one radiation cone of the redirected radar radiation and at least one radiation cone of the headlight light.

The positions of the components disclosed in this application for LiDAR radiation and the components disclosed for radar radiation can be interchanged. This applies in particular to the illustrated sensor components and the radiation manipulators.

In particular, the beam manipulators for LiDAR radiation and the beam manipulator for radar radiation can be positioned independently of each other in the headlamp. This also applies independently of the positioning in the beam path. In particular, the radiation manipulator for LiDAR radiation can be located both before and after the radiation manipulator for radar radiation in the radiation path.

Preferably, the multispectral emission device is characterized in that it comprises at least one transmitting unit for LiDAR radiation and one receiving unit for LiDAR radiation and at least two radiation manipulators, wherein one of the radiation manipulators is a LiDAR radiation manipulating device, at least one other of the radiation manipulators is a radar radiation manipulating device, the radiation manipulator for LiDAR radiation and the transmitting unit for LiDAR radiation being arranged such that the radiation manipulator for LiDAR radiation redirects LiDAR radiation emitted by the transmitting unit for LiDAR radiation, the radiation manipulator for LiDAR radiation being arranged such that that LiDAR radiation passing from the outside through the headlamp cover is guided to the receiving unit for LiDAR radiation and that the radiation manipulator for radar radiation is arranged such that radar radiation passing from the outside through the headlamp cover is guided to the receiving unit for radar radiation and wherein the transmitting unit for LiDAR radiation, the radiation manipulator for LiDAR radiation, the radar module and the radiation manipulator for radar radiation are arranged such that at least one radiation cone of the redirected LiDAR radiation and at least one radiation cone of the redirected radar radiation are parallel and/or coaxial and overlap one another.

The term radar comes from the English terms radio detection and ranging.

LiDAR refers in particular to a device, a system (Light Detection and Ranging) or the radiation used for this purpose.

The present application also discloses other embodiments in which, unless explicitly excluded, further developments and embodiments relating to LiDAR radiation can also be used for radar radiation.

Similarly, embodiments in which, unless explicitly excluded, further embodiments and embodiments relating to radar radiation can also be used for LiDAR radiation.

A non-limiting embodiment of the multispectral emission device is characterized in that it comprises at least one transmitting unit for LiDAR radiation and one receiving unit for LiDAR radiation and at least two radiation manipulators, wherein one of the radiation manipulators is a LiDAR radiation manipulating device, at least one radiation manipulator for radar radiation is a radiation manipulating device, wherein the radiation manipulator for LiDAR radiation and the transmitter unit for LiDAR radiation are arranged such that the radiation manipulator for LiDAR radiation redirects LiDAR radiation emitted by the transmitter unit for LiDAR radiation such that at least one radiation cone for redirected LiDAR radiation is parallel and coaxial to a light cone emitted by the light source, wherein the radiation manipulator for radar radiation is a preferably frequency-selective radar radiation manipulating device, wherein the radiation manipulator for radar radiation and the radar module are arranged such that the radiation manipulator for radar radiation redirects radar radiation emitted by the radar module such that at least one radiation cone for redirected radar radiation is parallel, coaxial and/or overlapping with the light cone emitted by the light source (102), in that the radiation manipulator for LiDAR radiation (130) is set up such that LiDAR radiation passing through the headlight cover from the outside is guided to the receiver unit for LiDAR radiation (150, 150b), and in that the second radiation manipulator (140) is set up such that radar radiation passing through the headlight cover from the outside is guided to the receiver unit for radar radiation (150, 150b).

Radiation manipulator means a unit that is adapted to make one or more of the following changes to electromagnetic radiation:

Reflection;
Transmission;
Distraction;
Radiation shaping;
Radiation focussing;
Radiation splitting;
Radiation merging.

A multispectral emission device is thus provided, in particular for vehicles, set up for emitting electromagnetic radiation and set up for detecting at least reflected electromagnetic radiation, with: a headlamp with a light-transparent headlamp cover and a light source arranged behind the headlamp cover, i.e. in front of the headlamp cover in the direction of emission, and with a radar module with at least one radar antenna unit and a LiDAR module with at least one LiDAR receiver unit arranged behind the headlamp cover and integrated in the headlamp, wherein the multispectral emission device has two radiation manipulators.

Preferably, an integral headlamp with high transmission of illumination wavelengths in the visible wavelength range, a frequency-selective beam deflector for the LiDAR wavelength and a frequency-selective beam deflector for the radar radiation, whereby all three wavelength ranges are combined in a coaxial system concept, is also provided.

The coaxial or overlapping integration of light as well as LiDAR and radar sensors enables the combination of multispectral wavelength ranges over several orders of magnitude. The detection possibilities realized with this invention contribute significantly to an increase in the degree of automation of vehicles on the way to autonomous driving.

The invention has several advantages that can be realized both individually and in combination with one another. These are in particular:

Detection of objects in the far and near field, both in front of and next to the vehicle using LiDAR and radar Increased sensor density in the vehicle: compact installation space through coaxial and/or overlapping integration of LiDAR, radar and lighting technology in the headlamp housing Increased reliability and robustness through simplified data fusion of complementary sensor data from LiDAR and radar, which have the same detection direction.

Flexibility in the utilization of the headlamp installation space through degrees of freedom in the development of the reflective/transmissive structures when guiding the radar radiation.

According to the invention, the multispectral emission devices disclosed in the present application can also be operated in such a way that LiDAR radiation in the form of a primary LiDAR signal is emitted as focused electromagnetic radiation in a LiDAR radiation cone, that radar radiation in the form of a primary radar signal is emitted as focused electromagnetic radiation in a radar radiation cone, that the LiDAR radiation cone and the radar radiation cone are parallel, coaxial and overlapping, that secondary LiDAR signals reflected by at least one object and radar signals reflected by the object are detected independently of each other and, if necessary, analyzed in combination with each other, that one, several or all of the following information is obtained from the analysis:

an angle or a direction to the object a distance to the object (from the time difference between sending and receiving)

a relative movement between the multispectral emission device (110) and the object and that the parallelism, coaxiality and overlap of the LiDAR radiation cone and the radar radiation cone are taken into account in the evaluation.

Particularly advantageous is the independence of radar, LiDAR and headlight light, especially with regard to their directions, which enables independent scanning of different sensor wavelengths and illumination wavelengths.

It is particularly advantageous that at least one further LiDAR radiation cone and/or one further radar radiation cone is emitted so that the object is detected with angular resolution.

According to the invention, there is further provided a vehicle characterized in that it comprises at least one of the multispectral emission devices disclosed in this application and a unit for a fusion of sensor measurement data for radar and LiDAR.

Preferably, at least one micro-optic is used, in particular in the beam path of the headlamp light. The micro-optics are used to achieve the desired intensity distribution of the headlamp light.

This makes it possible to adapt the headlamp light to operational requirements, in particular to the operational requirements of a vehicle in which the headlamp is installed.

Examples of lighting scenarios that can be reliably realized in this way are low beam and high beam.

The dipped beam is a sharp asymmetrical cut-off line in the upper part of the beam and a more or less sharp fall-off in the lower and lateral part of the beam.

The high beam is a symmetrical light beam, but with the option of dynamically adjusting the light beam (switching individual segments on and off).

This can also be achieved with a conventional spotlight, but with micro-optics there is the added advantage of higher transmission (i.e. efficiency) and much greater compactness.

Preferably, the use of micro-optics is analogous to that described in the German patent applications DE 10 2018 217 215 A1 and DE 10 2018 217 213 A1 of the applicant of the present patent application.

Based on collimated LED light sources, the micro-optics are used for ECE-compliant shaping of the angular distribution of the intensity of the low beam and high beam. In addition, the functionality of a segmented high beam is realized in order to avoid dazzling oncoming drivers. Compared to conventional optical realizations for automotive headlights, e.g. with free-form mirrors and aspherical lenses, the micro-optical beam deflection enables high transmission, short construction length and flexible design of the contours of the light modules for low beam and high beam.

In accordance with the invention, in particular an integration approach is provided in which the electromagnetic radiation from headlamp light and LiDAR and radar sensors is combined coaxially within a headlamp via a jointly used transmission and reflection element.

Depending on the sensor system and the wavelength spectrum used, special thin films are preferably used, some of which are selectively structured. In this way, multispectral wavelength ranges from visible light to millimeter waves (preferably from 400 nm to 4 mm) can be coaxially integrated over several orders of magnitude. The actual sensors and, if necessary, other components of LiDAR modules or radar modules can then be mounted outside the field of view of the headlamp. This creates a compact multispectral sensor/headlamp system that can be easily calibrated. LiDAR transmitters and LiDAR receivers can already be aligned with each other before mounting, but alignment after mounting is particularly advantageous, as alignment after mounting improves alignment with at least one of the beam modifiers in particular.

The headlamp system is preferably designed so that area-selective illumination as well as angle-resolving object detection in the near and far range can be carried out using radar, LiDAR and array light emitters. Wavelength-selective structures allow the influencing of sensor-specific spectral ranges and thus the reduction of thermal effects caused by unwanted absorption. Through further thermal isolation of the individual components, in particular their spatial and thermal decoupling, phase shifts, increased noise levels and localization inaccuracies of sensors and lighting can also be largely avoided in the integration approach. Highly selective sensor situations are realized by using individually addressable VCSEL arrays and photodetector pixels.

The LiDAR transmitter unit is preferably an array light emitter. Alternatively, this can also be a single edge emitter laser, but VCSEL arrays are particularly advantageous.

Thermal insulation of the LiDAR transmitter unit has the advantage that a temperature-dependent wavelength drift of the LiDAR transmitter unit can be avoided through thermal insulation. This is particularly advantageous because the LiDAR receiver has a defined bandpass filter through which only a narrow wavelength range can be received. If the laser drifts out of this range due to the temperature, the secondary LiDAR radiation is no longer received. VCSEL arrays also have the further advantage that they are much less sensitive to temperature than conventional lasers.

The arrangement of the visible light-emitting elements, the radar module and the LiDAR module allows the heat-emitting components to be thermally separated from each other with the aid of the radiation manipulators. This improves the thermal insulation of the LiDAR module in particular, especially the LiDAR transmitter unit.

In contrast to previously tried and tested technologies, the arrangement according to the invention makes it possible to utilize the advantages such as protection and integrated design within the headlamp for radar technology and LiDAR technology in a particularly flexible manner and with a high degree of variability, without having to accept any noticeable restrictions with regard to the lighting function.

In particular, the headlamp cover can be made of a transparent material, such as glass or transparent plastics. The headlamp cover or its material is (per se) transparent for light and radar radiation (HF waves). It is particularly advantageous to use a headlamp cover that has the lowest possible attenuation, refraction and scattering of the electromagnetic radiation used, preferably radar radiation, LiDAR radiation and headlamp light.

Radar is to be understood as one of the already available or established technologies for emitting and detecting electromagnetic waves, possibly of different wavelength ranges, i.e. radar in the general sense of "Radio Detection And Ranging" or "Radio Direction And Ranging". This radar technology can include waves of different frequency ranges.

Radar radiation is emitted in the form of a primary signal as bundled electromagnetic radiation and received in the form of reflected echoes from objects as a secondary signal and analyzed taking at least one criterion into account.

One, several or all of the following information can be obtained from the electromagnetic waves received and reflected by the object:

the angle or direction to the object the distance to the object (from the time difference between sending and receiving)

the relative movement between the transmitter and the object—this can be calculated from the shift in the frequency of the reflected signal using the Doppler effect The sequence of individual measurements provides the distance and the absolute speed of the object.

LiDAR is one of the already available or established technologies for emitting and detecting electromagnetic waves, in particular near-infrared radiation, preferably in the wavelength range of 800 nm-3000 nm. In particular, this is modulated, preferably pulsed laser radiation in one or more wavelength ranges.

LiDAR radiation is also emitted in the form of a primary signal as bundled electromagnetic radiation and received in the form of reflected echoes from objects as a secondary signal and analyzed taking at least one criterion into account.

One, several or all of the following information can be obtained from the electromagnetic waves received and reflected by the object:

the angle or direction to the object the distance to the object (from the time difference between sending and receiving)

the relative movement between the transmitter and the object—this can be calculated from the shift in the frequency of the reflected signal using the Doppler effect The sequence of individual measurements provides the distance and the absolute speed of the object.

The evaluation of the radar radiation and the evaluation of the LiDAR radiation preferably result in complementary and/or overlapping information.

The invention provides a multispectral emission unit which, in particular, emits at least partially coaxial electromagnetic radiation in at least three different wavelength ranges, sometimes over four orders of magnitude.

The multispectral emission unit according to the invention emits electromagnetic radiation in at least three wavelength ranges, in a non-limiting embodiment over four orders of magnitude:

Visible light radiation, especially in the range between 400 nm and about 780 nm, LiDAR radiation, in particular in the wavelength range between 800 nm and 3000 nm, preferably in wavelength ranges of 860-940 nm and possibly one or more further wavelength ranges, or one or more further wavelengths, for example 1550 nm.

Radar radiation, especially in wavelength ranges between 1 mm and 100 mm, in particular between 3.7 mm and 4 mm.

An advantageous embodiment of the multispectral emission device is characterized in that the radiation manipulator for LiDAR radiation is designed in such a way that LiDAR radiation emitted by the transmitting unit for LiDAR radiation is redirected in such a way that at least one further radiation cone for redirected LiDAR radiation is formed and that at least one receiving unit for LiDAR radiation is provided, wherein the further receiving unit for LiDAR radiation is arranged such that further LiDAR radiation passing through the headlight cover from the outside is guided to the receiving unit for further LiDAR radiation.

An expedient embodiment of the multispectral emission device provides that the radiation manipulator for radar radiation is designed such that radar radiation emitted by the radar module is redirected such that at least one further radiation cone for redirected radar radiation is formed and that at least one receiving unit for radar radiation is provided, wherein the receiving unit and/or a further receiving unit for radar radiation is arranged in such a way that further radar radiation passing through the headlight cover from the outside is received in other surface areas than "the other" secondary radar radiation is directed.

The radar waves are deflected by an arbitrary but defined angle, preferably 90°, using reflect and/or transmit arrays. This deflects the electromagnetic wave without additional focusing. This makes it possible to use any automotive radar on the headlamp in front of the deflection system, which is an important advantage.

A structure, preferably consisting of phase-controlling, polarization-selective dielectric and/or conductive, light-transparent layers, is produced by a customized thin-film deposition paired with position-selective laser ablation. The radar beams can be deflected independently of the shape (e.g. planar, curved or with any geometry) of the reflect/transmit array and thus offers degrees of freedom in the realization of the overall system, particularly with regard to the beam path of the LiDAR and light emitter.

One possible embodiment is the use of several such reflective, transmissive or simultaneously reflective and transmissive structures to realize any beam paths in order to create further degrees of freedom in the realization of the overall system.

An additional embodiment is the use of one or more such reflective, transmissive or simultaneously reflective and transmissive structures to realize several beam paths in order to use several radar and/or LiDAR sensors. This also includes the coverage of different detection areas by different sensors. A further design based on this is the use of additional frequency-selective surfaces in order to be able to divide/discriminate beam paths along the frequency.

A further advantageous embodiment is the combination of electrical elements with mechanically adjustable alignments, in particular by rotation, in order to be able to adjust/change optical beams and millimeter waves simultaneously and/or independently of each other. This is done in particular according to the non-limiting embodiments shown below.

An advantageous further development of the multispectral emission device is characterized by the fact that at least one of the radiation manipulators (130, 140) is rotatably mounted along at least one axis.

Non-limiting embodiments of the invention enable fast and reliable adjustment of one or more FOVs. FOV refers to a field of view of a respective sensor receiver, in particular the radar module or the LiDAR module, which is changed by at least one of the radiation manipulators.

A rotational mounting of at least one of the beam manipulators about a z-axis is particularly advantageous when the spotlight is being set up for the first time, as this makes assembly easier.

A rotational mounting and active swiveling of at least one of the beam manipulators (130, 140) about a y-axis is particularly advantageous during operation of the spotlight, as this allows a horizontal FOV to be set quickly and reliably.

An expedient embodiment of the multispectral emission device provides that at least one of the radiation manipulators is rotatably mounted about the y-axis during operation of the multispectral emission device, so that a horizontal FOV can be set quickly and reliably.

An advantageous further development of the multispectral emission device is characterized in that at least one of the radiation manipulators (130, 140) is rotatably mounted about an x-axis during operation of the multispectral emission device (110), so that a vertical FOV can be set quickly and reliably.

Due to the rotational mounting and active swiveling of at least one of the radiation manipulators about the y-axis as shown in this application, the FOV of the LiDAR radiation and/or the radar radiation can be swiveled to the left or right following a curve of a route, in particular while a vehicle equipped with at least one multispectral emission device according to the invention is travelling.

Furthermore, car manufacturers can adjust the sensors in the headlights accordingly, e.g. more in the direction of travel or outwards, especially depending on the FOVs of other sensors on the car.

A rotational mounting and active swiveling of at least one of the radiation manipulators about an x-axis is particularly advantageous during operation of the headlamp, as this allows a vertical FOV to be set quickly and reliably. As a result, a FOV of the LiDAR radiation and/or the radar radiation can be swiveled up and down following the course of a route in the case of valleys/mountains, in particular while a vehicle equipped with at least one multispectral emission device according to the invention is travelling.

An expedient embodiment of the multispectral emission device provides that at least two of the radiation manipulators can be rotated independently of each other about at least one of the axes during operation of the multispectral emission device, so that FOVs of the LiDAR radiation and the radar radiation can be set independently of each other by rotating the two radiation manipulators separately.

In particular, it is thus possible to change the FOV of the radar radiation and the LiDAR radiation independently of each other by rotating at least two radiation manipulators separately and thus to change the FOVs of the LiDAR radiation and the radar radiation quickly, independently and reliably separately from each other and, in particular, to swivel them separately from each other.

It is particularly advantageous to design the multispectral emission device so that it can be connected to a control unit, the control unit being set up so that it can control the radiation manipulators during operation of the multispectral emission device so that the radiation manipulators can each be rotated independently of one another about at least one of the axes, so that the FOVs of the LiDAR radiation and the radar radiation can be set independently of one another by the separate rotation of the at least two radiation manipulators, and so that the separate rotation of the radiation manipulators can be used to increase the detection accuracy of objects.

This useful embodiment of the multispectral emission device enables an advantageous method of operating it, characterized in that the multispectral emission device is connected to a control unit, wherein the control unit controls the radiation manipulators during the operation of the multispectral emission device (110) such that the radiation manipulators are rotated independently of each other about at least one of the axes, so that the separate rotation of the at least two radiation manipulators FOVs of the LiDAR radiation and the radiation manipulators FOVs of the LiDAR radiation and the radiation manipulators FOVs of the LiDAR radiation are controlled by the control unit, that the radiation manipulators are each rotated independently of one another about at least one of the axes, so that FOVs of the LiDAR radiation and of the radar radiation can be set independently of one another by the separately occurring rotation of the at least two radiation manipulators, and that the separately occurring rotation of the radiation manipulators is used in real time to increase the detection accuracy of objects.

It is further preferred that a vehicle comprising at least one—preferably at least two—of the multispectral emission devices illustrated in this application is configured to comprise a control unit, wherein the control unit is arranged to control the radiation manipulators during operation of the multispectral emission device (110) such that the radiation manipulators can be rotated independently of each other about at least one of the axes, so that by rotating the at least two radiation manipulators separately, FOVs of the LiDAR radiation can be determined, that the radiation manipulators can be rotated independently of each other about at least one of the axes, so that FOVs of the LiDAR radiation and the radar radiation can be set independently of each other by the separate rotation of the at least two radiation manipulators, and that the separate rotation of the radiation manipulators can be used to increase the detection accuracy of objects.

Advantageous embodiments relating to the arrangement of the radar module are described below.

According to an advantageous embodiment example, the radar module and the LiDAR module are arranged outside (in particular below or behind) a light cone emitted by the light source. In other words, the radar module and the LiDAR module can be arranged outside the light propagation area, i.e. laterally spaced from the optical axis of the light source(s). According to an embodiment example, the radar module and/or the LiDAR module are arranged below a tangential plane or horizontal plane delimiting the light reflector downwards. According to an embodiment example, the radar module and/or the LiDAR module are arranged outside (in particular laterally, above or below) an optical axis or an axis corresponding to the main orientation of the light reflector or the light source. This also makes it possible to optimize the relative arrangement to each other. Optionally, a/the radar module can be arranged behind the light source(s), in particular with an alignment of the optical axis of the radar module essentially parallel to (or in alignment with) the central longitudinal axis of a light cone of the light sources. A radiation manipulator can be arranged between the radar module and the light sources.

Radar emitters and receivers as well as LiDAR reemitters and receivers are not arranged in the beam path, but outside of it. By reflecting the radar radiation at the radiation manipulator and by deflecting the radar radiation in the range of 60 to 120°, in particular 90°, the radar radiation can be modified in the direction of the front of the vehicle if the individual components are arranged in an advantageous relative position, and at the same time radiation deflection can also be ensured.

In particular, the radar module or a radar emitter and receiver can be aligned vertically upwards. A transparent radiation manipulator (in particular a so-called Fresnel Reflectarray) with a coating can be arranged in front of it. The antennas used in the radar module are preferably planar antennas (e.g. patch). The antennas can preferably be integrated into the radar module via transmission lines (e.g. microstrip lines) without additional adapters. The antennas can consist of several individual antennas or array antennas, particularly in a two-dimensional arrangement.

Both beam manipulators are transparent to the visible light from the headlamp light source and mainly reflect the radar radiation and/or the LiDAR radiation and guide it forwards through the headlamp cover. In the process, the beam manipulator may modify the radar beam into a desired lobe or surface shape.

The cover can be coated to provide the frequency-selective passband structure and to allow only radar radiation in a certain band range to pass through.

According to one embodiment, the radar module and the LiDAR module are arranged in an area outside the light cone of the headlamp light. This also provides an advantageous decoupling from the lighting function.

According to an embodiment example, the radar module and/or the LiDAR module are arranged on the base of a housing of the headlamp, in particular in mechanical coupling to the base. This also favors decoupling from the lighting function.

According to one embodiment, the radar module and/or the LiDAR module are below the horizontal axis of the electromagnetic emission direction, with the LiDAR module in particular being tilted by 90° and folded over an additional LiDAR-modifying element. This favors the calibration of the system and creates a more compact overall system.

According to an embodiment example, at least one of the radiation manipulators is arranged in a radiation direction of the radar radiation.

According to an embodiment example, at least one of the radiation manipulators is arranged in the direction of reflection of the radar radiation.

According to an embodiment example, at least one of the radiation manipulators is arranged in a radiation direction of the LiDAR radiation.

According to an embodiment example, at least one of the radiation manipulators is arranged in the direction of reflection of the LiDAR radiation.

According to an embodiment example, at least one of the radiation manipulators is flat, in particular planar or curved.

According to an embodiment example, at least one of the radiation manipulators is frequency-selective, in particular in that the radiation manipulator comprises a frequency-selective radiation deflection structure. The radar radiation-manipulating device is designed to be frequency-selective in particular in that the radiation manipulator used for manipulating the radar radiation has conductive and/or dielectric structures with dimensions that are matched to the wavelength of the radiated radar radiation (frequencies).

According to an embodiment example, at least one of the radiation manipulators is arranged in the direction of radiation of the light source.

According to an embodiment example, at least two radar radiation-manipulating areas, each with an individual radar radiation-manipulating function, are provided on at least one of the radar radiation-manipulating devices. This also makes it possible to individually influence a first part of the radar radiation and to individually influence a second part of the radar radiation in a different way than the first part, in particular for the purpose of optimized detection in near and far ranges and/or in front and side ranges.

According to one embodiment example, at least two of the radar beam manipulating areas are arranged/formed in the same radar beam manipulating device. This also enables extensive functional integration.

In particular, the different radar radiation manipulating areas can comprise at least one electrically conductive area and at least one electrically non-conductive area.

In particular, the radar radiation forms a radiation front, which can be reflected by means of the arrangement according to the invention, especially in the electrically conductive areas, so that an interference pattern can be predefined.

Advantageous embodiments relating to the alignment of the radar module and/or the LiDAR module or relating to the arrangement of the radar module and/or the LiDAR module relative to other components are described below.

According to an embodiment example, an optical axis of the radar module and/or the LiDAR module or the radar antenna unit is aligned at least approximately vertically upwards (perpendicular) in the intended arrangement of the headlamp. According to an embodiment example, the optical axis of the radar module and/or the LiDAR module or the radar antenna unit is directed towards a radiation manipulator arranged behind the headlamp cover integrated in the headlamp and behind the light source in the direction of radiation, whereby the optical axis of the radar module and/or the LiDAR module is aligned with the radiation manipulator in such a way that the radar module and/or the LiDAR module is arranged at the bottom of the headlamp. This also enables local decoupling of the radar module and/or the LiDAR module from the light propagation path.

The relative positioning of the radar module and/or the LiDAR module, whereby the antenna module and the radar module are designed as separate components in some embodiments and as an integrated component in others, remains comparatively flexible, particularly as it is sealed off from the outside of the headlamp. The relative positioning described here has proven to be particularly advantageous.

Advantageous embodiments relating to the radar antenna unit are described below.

According to an embodiment example, the radar antenna unit has a plurality of individual antennas or antenna arrays in a two-dimensional arrangement. This favors high variability when adjusting the radiation characteristics.

In one embodiment, the radar antenna unit is integrated into the radar module using microstrip cables without additional adapters. This also facilitates integration.

In particular, the radar module can contain all those RF front ends and electronic components and circuits that can be manufactured on planar dielectric substrates. The antennas are advantageously all located at the base (bottom) of the headlamp housing in the vicinity of the headlamp cover, in particular in an arrangement at least partially overlapped by the headlamp cover.

A radiation-effective cover is arranged in an intermediate plane between the radiation manipulator for LiDAR radiation, or in particular for radar radiation, and the radar module, in particular in a direction/plane at least approximately orthogonal to the optical axis of the radar module, in particular in order to optically shield the radar module. The cover is advantageously made of flat, thin plastic (in particular polycarbonate), whereby the plastic can have a dark coating on one side. The cover is preferably arranged and set up to act as a heat shield for electronic components. This arrangement of the cover also provides a slim design.

Advantageous embodiments relating to a radiation manipulator for LiDAR radiation, or in particular for radar radiation of the arrangement according to the invention, are described below.

According to an embodiment example, the multispectral emission device has a radiation manipulator for LiDAR radiation, or in particular for radar radiation, arranged behind the headlamp cover and integrated into the headlamp, whereby the radar module can be arranged below, above or to the side of the radiation manipulator for LiDAR radiation, or in particular for radar radiation.

In the arrangement according to the invention, a radiation manipulator for LiDAR radiation, or in particular for radar radiation, and optionally also a high-frequency lens as a component of the radar radiation manipulating device can adapt the radar radiation in a particularly flexible manner (i.e. with high variability) according to the respective situation, in particular largely decoupled from the lighting function. If the radar system is integrated into a motor vehicle headlamp, its radar signal can be customized to the desired detection range, in particular by means of at least one structured conductive layer/surface (radiation deflection structure, in particular with patterns in the sense of functional small structures) in the radar radiation manipulating device. In addition, the headlamp of a motor vehicle can also assume a protective function for the radar technology, in particular thanks to the headlamp cover.

According to an embodiment example, the beam path of the radar radiation or LiDAR radiation is deflected by means of the radiation manipulator for LiDAR radiation, or in particular for radar radiation or LiDAR radiation in the range of 60 to 120°, in particular in the range of 90°, and in particular at least approximately aligned in the direction of radiation of the multispectral emission device. This also provides advantages with regard to the relative arrangement of the components to each other.

According to an embodiment example, the radiation manipulator for LiDAR radiation, or in particular for radar radiation, has a two-dimensional extension. This can also maximize the simplicity and robustness of the design.

According to an embodiment example, the radiation manipulator, in particular its inner side, is arranged with an inclination in the range of 35° to 60°, in particular 40° to 50°, relative to the direction of radiation z or relative to the horizontal, at least in sections. According to one embodiment example, the radiation manipulator is arranged relative to the headlight cover in such a way that the radiation manipulator and the headlight cover form a roof structure covering the radar module and/or the LiDAR module with the geometry of a saddle roof with two oppositely inclined surfaces, in particular with an included angle in the range of 45° to 90°. This also provides an advantageous relative arrangement in each case and can facilitate functional integration.

According to one embodiment, the arrangement and/or alignment of the radiation manipulator can be adjusted by motor. This also enables great variability and can extend the range of functions.

According to one embodiment example, the radiation manipulator has a three-dimensional extension at least in sections and is set up to also reflect radar radiation or LiDAR radiation laterally. This also extends the functionality. In particular, a high/broad functionality can also be ensured in a small installation space with simple means. According to an embodiment example, the radiation manipulator for radar radiation is formed from a plurality of two-dimensional elements and thus has a two-dimensional or, with respect to all elements, a two-dimensional or three-dimensional extension for each element. This also provides a high degree of variability.

According to one embodiment example, the radiation manipulator for radar radiation is designed as a Fresnel reflector, whereby both sides of the radiation manipulator for radar radiation have a frequency-selective radiation deflection structure. This makes it possible to influence the radiation characteristics in a very targeted manner.

According to an embodiment example, the radiation manipulator for radar radiation consists of light- and radar radiation-transparent substrate material and has a radiation manipulator, in particular in the form of a coating or as an electrically conductive surface, in particular with a frequency-selective radiation deflection structure. This can also ensure a particularly simple and robust design. The at least one electrically conductive layer or surface that is transparent to light can, regardless of its arrangement, be formed in particular from a light-transparent electrically conductive oxide or a sufficiently thin metal layer, preferably silver.

According to one embodiment, the beam manipulator has a beam-manipulating device and is arranged relative to the headlamp cover in such a way that the radar radiation from the radar module or LiDAR radiation from the LiDAR module to outside the headlamp cover passes/radiates through a/the respective frequency-selective beam deflection structure at least twice. This also provides a high degree of variability. In other words, the radar radiation can be guided via a first filter provided by the radiation manipulator for radar radiation (first radiation deflection structure) and, after deflection, also via a second filter provided by the headlight cover (second or further radiation deflection structure). Similarly, the LiDAR radiation can be guided via a first filter (first radiation deflection structure) provided by the radiation manipulator and, after deflection, also via a second filter (second or further radiation deflection structure) provided by the headlamp cover.

According to an embodiment example, the radiation manipulator for radar radiation is formed from individual reflector elements, each of which is rectangular or triangular, in particular with the same side length.

This provides a kind of modular structure for high variability, especially with a simple basic structure of each individual reflector element.

According to an embodiment example, the radiation manipulator for radar radiation has a light-transparent, electrically conductive coating on at least one of its surfaces, in particular with one or more oxide layers or an electrically conductive surface. This provides good reflectivity for the wavelength of the radar radiation used. The radiation manipulator can be provided at least partially by means of the oxide layer. This type of integration of the radiation deflection structure not only provides comparatively high variability (keyword: influencing the way the radiation propagates) but also advantages in terms of space requirements.

According to one embodiment, the radiation manipulator for radar radiation is light-transparent (transparent for LiDAR radiation or visible radiation). This also provides good variability with regard to an arrangement relative to the light source.

According to one embodiment, the LiDAR radiation modifier is transparent to radar radiation.

According to one embodiment, the radiation manipulator for radar radiation is set up to shape the radar radiation, in particular in the form of a beam or area. This extends the application possibilities.

The radiation manipulator for radar radiation can consist of substrate material that is transparent not only for the light but also for the RF waves. In particular, the reflectivity can be adjusted or predetermined by coating one or two sides of the substrate with a very thin, transparent, conductive oxide.

The beam manipulators are preferably arranged close to the headlight housing, well in front of the light source. The arrangement is preferably between the headlamp cover and the beam shaping optics.

The radiation manipulator for radar radiation is inclined or aligned in such a way that the emitted HF waves can illuminate the intended objects correctly and that the received waves can be focused on the receiving antenna.

Advantageous embodiments concerning at least one of the radar beam manipulating device with preferably frequency-selective beam deflection structure are described below.

According to an embodiment example, at least one or the respective radar radiation manipulating device with frequency-selective radiation deflection structure has a periodic arrangement of structure patterns, at least in sections, with the structure patterns in particular in concentric arrangement. This also enables the arrangement according to the invention to be designed and optimized in a particularly flexible manner with regard to individual applications.

According to an embodiment example, the radiation manipulator with preferably frequency-selective radar reflection structure is designed as a coating or as a film or as an electrically conductive surface. This can further simplify the design. In particular, a coating can be provided as a supplement to integrated patterns or structures.

According to one embodiment example, a polymer, in particular a polycarbonate, forms an advantageous substrate for the radiation manipulator or for the frequency-selective radar reflection structure. This provides a particularly robust structure, especially in the form of a base module, which can be used and further customized for various applications.

According to one embodiment, the radiation manipulator has a conductive part in the form of a light-transparent, electrically conductive oxide layer. This also enables the reflective properties to be optimized.

The beam manipulator can have different designs, which are not limited to simple geometries (e.g. complementary loop, cross, strip), but can also include, for example, more complex meander-based slots (especially for the bandpass), in particular to reduce the size of the unit cell and achieve better angular stability.

Advantageous embodiments relating to the radiation manipulator and the carrier substrate for the radar radiation manipulating device are described below.

According to one embodiment example, the radiation manipulator consists of light- and radar-transparent material, in particular substrate material for the preferably frequency-selective radar reflection structure in the form of an integrated coating. This enables an even more extensive integration of functions, especially with a robust design.

According to one embodiment, the radiation manipulator has a thickness corresponding to an integer multiple of half the wavelength of the radiated radar radiation. This also makes it possible to optimize the transmission properties.

According to one embodiment, a preferably frequency-selective radar reflection structure is provided on both sides (inside and outside) of the radiation manipulator. This favors a particularly targeted influence on the radiation characteristics.

According to an embodiment example, the multispectral emission device is designed without a projection lens in that the radar beam path runs from the radar module via the radiation manipulator for radar radiation and the headlight cover, the LiDAR beam path runs from the LiDAR module via the radiation manipulator for radar radiation and the headlamp cover and in that the light propagation path from the light source and the light reflector runs directly via the headlamp cover, i.e. in each case without further intermediate optical or radiation-effective components. In other words: the entire arrangement is without a projection lens, i.e. lensless. This also makes for a simple, compact and robust design.

The following is an example of a functional description.

By means of the arrangement according to the invention, selective scanning of the surrounding situation can be realized via a transmitting and receiving array, in which not only the area in front (frontal) but optionally also the side area (lateral) can be covered. This also reduces the number of sensor systems required in the headlamp. A significantly improved resolution can also be realized. Particularly with laser-based structuring of thin films, a desired beam deflection can be realized in a flexible manner, so that the adaptation of the radar properties to the respective headlamp type and to the desired scanning range in the near and far field can be optimized.

It has been shown that transparent plastic substrates can be coated with transparent but electrically conductive layers, which can then be removed locally. In particular, a laser process for thin-film removal can also be used to produce structures that can be customized for a particular application, with the advantage of largely residue-free removal without damaging the substrate and without optical disadvantages.

The radar reflection structure can optionally be applied lithographically and/or by means of masked coating and printing.

The aforementioned task is also solved in particular by a multispectral emission device, in particular for vehicles, set up to emit light, LiDAR radiation and radar radiation and set up to detect at least reflected radar radiation and reflected LiDAR radiation, with a headlamp with a light-transparent headlamp cover and a light source arranged behind the headlamp cover and a light reflector;

a radar module with a radar antenna unit and/or the LiDAR module arranged behind the headlamp cover and integrated in the headlamp; wherein the radar module and/or the LiDAR module is arranged in the direction of radiation z between the headlamp cover and the light source, wherein the radar module and/or the LiDAR module is arranged below an optical axis or an axis corresponding to the main orientation of the light reflector or the light source, wherein the radar module and/or the LiDAR module is arranged in an area below, above or to the side of the headlamp cover in an overlapping arrangement with the headlamp cover, above or to the side of the headlamp cover in an overlapping arrangement with the headlamp cover, an optical axis of the radar module and/or of the LiDAR module or of the radar antenna unit being aligned at least approximately vertically upwards in the intended arrangement of the headlamp, the multispectral emission device having a radiation manipulator arranged behind the headlamp cover and integrated in the headlamp, wherein the radar module and/or the LiDAR module is arranged below, above or to the side of the radiation manipulator, wherein the radiation manipulator for LiDAR radiation, or in particular for radar radiation, is arranged along the optical axis or an axis corresponding to the main orientation of the light source, wherein a/the beam path of the radar radiation is deflected by means of the radiation manipulator for radar radiation in the range of 60 to 120°, in particular in the range of 90°, in particular in the range of 90°, in particular being aligned at least approximately in the radiation direction z of the multispectral emission device, and wherein the radiation manipulator for radar radiation, in particular its inner side, is arranged with an inclination in the range of 35 to 60°, in particular 40 to 50°, relative to the radiation direction z or relative to the horizontal, at least in sections. This results in numerous previously mentioned advantages.

The aforementioned task is also solved by using a multispectral emission device, in particular a multispectral emission device described above, for emitting light, LiDAR and for preferably frequency-selective emission of radar radiation and for specifying a radar detection range by means of at least one, in particular by means of at least two radiation-manipulating devices, in particular frequency-selective reflection structures, which is/are also provided at least in or on at least one side of a light-transparent headlamp cover of the multispectral emission device which is transparent to radar radiation, in particular in the beam path starting from a radar module and/or the LiDAR module in series one behind the other in at least two positions comprising a position outside or inside the light cone of the light source (e.g. at a radiation manipulator arranged above the radar module and/or the LiDAR module), in particular in a headlight of a vehicle, in particular in a headlight of an automobile, wherein a radar module and/or a LiDAR module of the multispectral emission device is located outside a light cone emitted by the light source, of the at least one, in particular below the at least two beam-manipulating devices, with an optical axis of the radar module orientated upwards, in particular at least approximately orthogonally to the optical axis of a light source of the headlamp. This results in the aforementioned advantages. The vehicle can be an automobile (motor vehicle for the road) or an aircraft or a watercraft.

The aforementioned task is also solved by a multispectral emission device for vehicles and set up to emit light, LiDAR and radar radiation and set up to detect at least reflected radar radiation, having a headlamp with a light-transparent and radar-transparent headlamp cover and a light source and a light reflector arranged behind the headlamp cover, and having a radar module with a radar antenna unit arranged behind the headlamp cover and integrated in the headlamp, in particular by a multispectral emission device as described above, produced by forming at least one radar radiation-manipulating device, in particular in the form of a frequency-selective radar reflection structure, at least also on or in the headlamp cover (optionally used/serving as a substrate), the radiation manipulator having a conductive part in the form of a light-transparent, electrically conductive oxide layer, electrically conductive oxide layer or is at least partially formed thereby, and wherein a structure pattern is introduced into the radiation manipulator by thin-film ablation, in particular by means of lasers, for example ultrashort pulse lasers with pulse durations in the femtosecond to picosecond range or in the nanosecond range. in the nanosecond range With wavelengths adapted to the absorption of the coating, in particular but not exclusively in the ultraviolet wavelength range or in the visible wavelength range.

This results in the aforementioned advantages. It has been shown that structures introduced by means of lasers make it possible to control or adjust and specify the direction and beam characteristics of the radar radiation in a particularly precise manner.

The aforementioned problem is also solved by a method for emitting light, LiDAR and radar radiation and for detecting at least reflected radar radiation in each case by means of a multispectral emission device, in particular by means of a multispectral emission device described above, in particular in a vehicle, wherein light is emitted from a light source of a headlamp through a headlamp cover which is transparent to light and transparent to radar radiation in accordance with the direction of an optical axis of the light source, and wherein radar radiation and/or LiDAR radiation is emitted from a radar module arranged behind the headlamp cover integrated in the headlamp and/or the LiDAR module; wherein the radar radiation and/or LiDAR radiation is emitted by the radar module and/or the LiDAR module in a direction transverse, in particular at least approximately orthogonal, to the optical axis of the light source and via at least one radar radiation-manipulating device, in particular in the form of a frequency-selective radar reflection structure, which is also provided at least on or in the headlamp cover, is deflected in at least one radiation direction of the multispectral emission device, in particular at least approximately parallel to the optical axis of the light source, in particular in the direction of travel of a vehicle aligning the headlamp, whereby the radiation characteristic of the radar radiation is predetermined by means of the at least one radar radiation-manipulating device. This results in the aforementioned advantages.

According to one embodiment, the method also includes detection of reflected radar radiation, whereby the reflected radar radiation is detected in particular on the opposite beam path. This also extends the range of functions.

According to one embodiment, a structure pattern is introduced into the radiation manipulator by thin-film ablation or thin-film deposition. This can be done, for example, by laser ablation, by means of a film, by means of a printing, coating or vapor deposition process (sputtering, thermal evaporation and/or electron beam evaporation) and/or by means of lithography.

According to one embodiment, the radiation manipulator is produced by means of thin-film ablation or thin-film deposition or by applying a film.

BRIEF DESCRIPTION OF THE DRAWINGS

The terms Fig., Figs., Figure, and Figures are used interchangeably in the specification to refer to the corresponding figures in the drawings.

Further advantageous aspects and non-limiting embodiments of the invention can be found in the following illustration of non-limiting embodiments of the invention. The invention is described in more detail in the following drawing figures, whereby reference is made to the other drawing figures for reference signs which are not explicitly described in a respective drawing figure. It shows.

DESCRIPTION OF THE INVENTION

Figure 1:
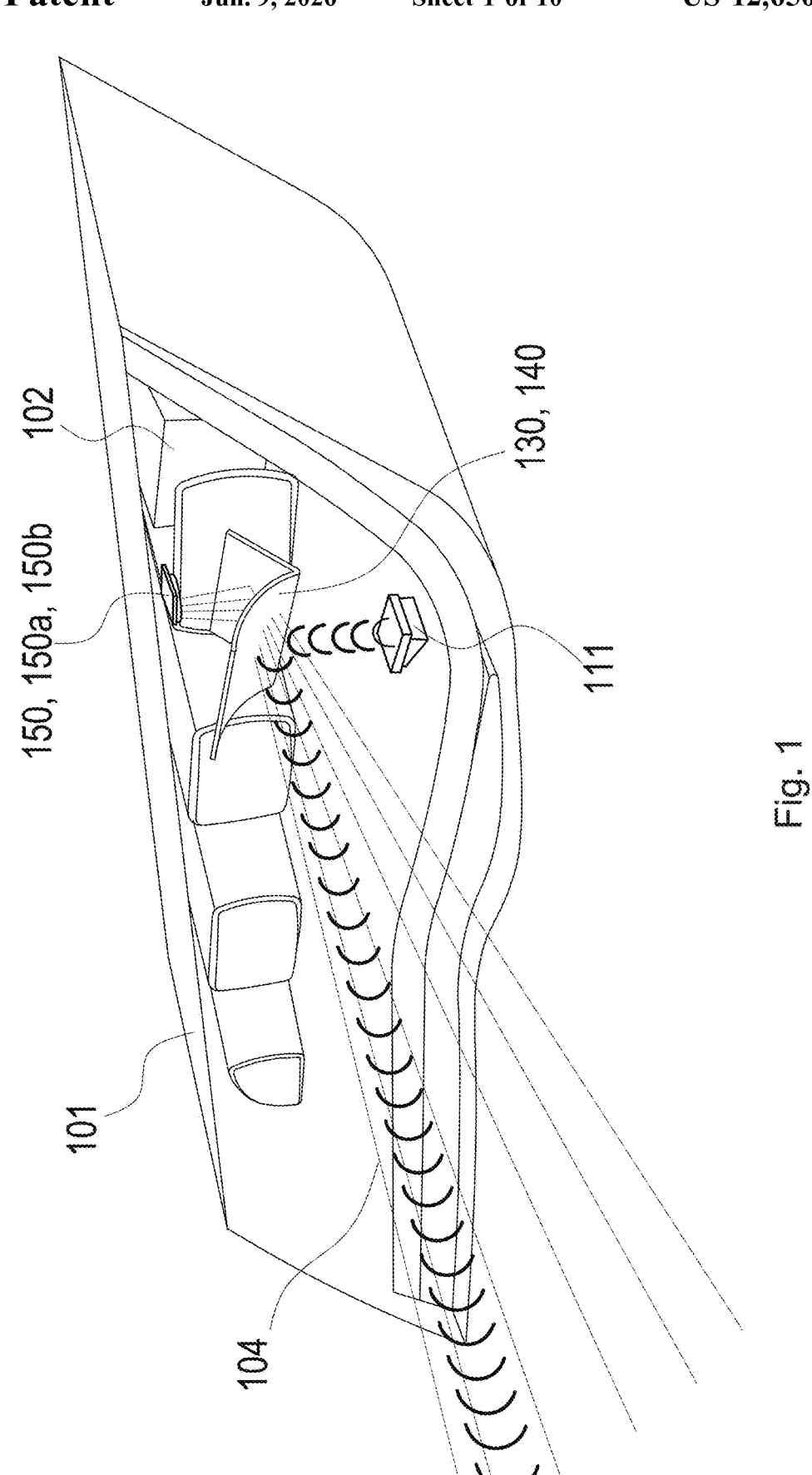
FIG. 1: Schematic perspective view of a multispectral emission device according to a non-limiting embodiment.

FIG. 1 shows a schematic perspective view of a multispectral emission device 110, in particular for vehicles, set up to emit electromagnetic radiation and set up to detect at least reflected radar radiation, with:
  a headlight (101) with a light-transparent headlight cover (4) and a light source (102) arranged behind the headlight cover;
  a radar module (111) with a radar antenna unit (112) arranged behind the headlamp cover and integrated in the headlamp, wherein the multispectral emission device (110) has at least one radiation-manipulating device.

This multispectral emission device (110) is characterized in that it comprises at least one transmitting unit for LiDAR radiation (150, 150*a*) and one receiving unit for LiDAR radiation (150, 150*b*) and at least two radiation manipulators (130, 140), wherein one of the radiation manipulators (130) is a frequency-selective LiDAR radiation manipulating device, at least one radiation manipulator for radar radiation (140) is a frequency-selective radar radiation manipulating device, wherein the radiation manipulator for LiDAR radiation (130) and the transmitter unit for LiDAR radiation (150, 150*a*) are arranged such that the radiation manipulator for LiDAR radiation (130) redirects LiDAR radiation emitted by the transmitter unit for LiDAR radiation (150, 150*a*) such that at least one radiation cone for redirected LiDAR radiation extends parallel and coaxially to a light cone emitted by the light source (102), wherein a radiation manipulator (140) for radar radiation is a frequency-selective radar radiation manipulating device, wherein the radiation manipulator for radar radiation (140) and the radar module (111) are arranged such that the second radiation manipulator (140) redirects radar radiation emitted by the radar module (111) such that at least one radiation cone for redirected radar radiation extends parallel and coaxially to the light cone emitted by the light source (102), in that the radiation manipulator for LiDAR radiation (130) is set up such that LiDAR radiation passing through the headlight cover from the outside is guided to the receiver unit for LiDAR radiation (150, 150*b*), and in that the radiation manipulator for radar radiation (140) is set up such that radar radiation passing through the headlight cover from the outside is guided to the receiver unit for radar radiation (150, 150*b*). This is preferably done coaxially and particularly preferably over four wavelength ranges.

FIG. 1 shows a headlamp 101 which has a light source 102 (optionally also a projection lens) and, in some embodiments, a light reflector not shown here. Furthermore, the headlamp 101 has a light-transparent headlamp cover 104. The light source 102 is aligned according to an optical axis 7 (main alignment) in such a way that the light is emitted in a light cone 109 through the headlight cover 104. This results in a light propagation path 106 which, starting from the light source 102, runs frontally forwards and is laterally limited by the specifications of the light reflector. According to one variant, the light propagation path 106 is a light cone.

It is particularly advantageous to use illumination modules with a short overall length as the light source 102. The use of irregular, micro-optical honeycomb condensers as beam-shaping tertiary optics for collimated LED light sources is particularly advantageous. The design architecture shown enables the smallest module apertures (and thus small dimensions of the beam manipulator with flexible contour design and the shortest installation lengths with high system transmission and allows fulfilment of the ECE standards for headlights as well as switchable angle distributions for glare-free lighting.

The flexibility in the design of the contour of the exit windows of the lighting modules allows optimum adaptation to the minimum radiation manipulator size specified by the LiDAR and radar, while also helping to fulfil the design specifications of the automotive designers (e.g. slot-shaped headlights).

The exemplary realization shown in FIG. 1 can either interleave both modules or just one, in which case preferably the less divergent high beam, with LiDAR and radar beam paths. The restriction to only one module reduces the required beam manipulator dimensions. The preferable choice of the transmissive path for the broadband illumination (450-650 nm) simplifies the design and realization of the beam manipulator.

The typical drop in the transmission of the beam manipulator for large angles can be minimized in the design of the lighting module. The stray light and back reflections that occur at the beam manipulators remain critical. Optimized beam manipulator designs optionally combined with shielding screens enable compliance with ECE specifications, e.g. for the contrast of the cut-off line of the dipped beam. An optional synchronized dark scanning of the LEDs during the short time window of LiDAR reception causes a reduction in brightness of only one or a few percent, but enables a significant improvement in the LiDAR SNR.

| Designate: | |
| --- | --- |
| 150 | Combined transmitter unit for LiDAR radiation and a receiver unit for LiDAR radiation |
| 150a | Transmitter unit for LiDAR |
| 150b | Receiver unit for LiDAR |

The use of radiation manipulators enables a space-efficient and design-friendly solution for up to 360° detection in vehicles by implementing them in the headlamp. An exemplary design in a front headlight (can also be integrated in the rear headlight) as well as the ranges of electromagnetic radiation depending on the wavelengths. For example, a planar reflector shapes and reflects the LiDAR radiation, while a curved reflector deflects the radar radiation without affecting the transmission of the LiDAR radiation. The shape of the reflect/transmit arrays can be arbitrary (planar, radially curved, oval curved) including a flexible pattern array of the coating so that, for example, center pixels receive a smaller/larger field of view (FOV) than edge pixels of the LiDAR/radar system. Both components of the beam manipulator allow the light from the spotlight to be transmitted. The shape and position of the emitter (sensor-transmitter unit) and the deflector or beam shaper (beam manipulator) are exemplary and may vary.

Figure 2:
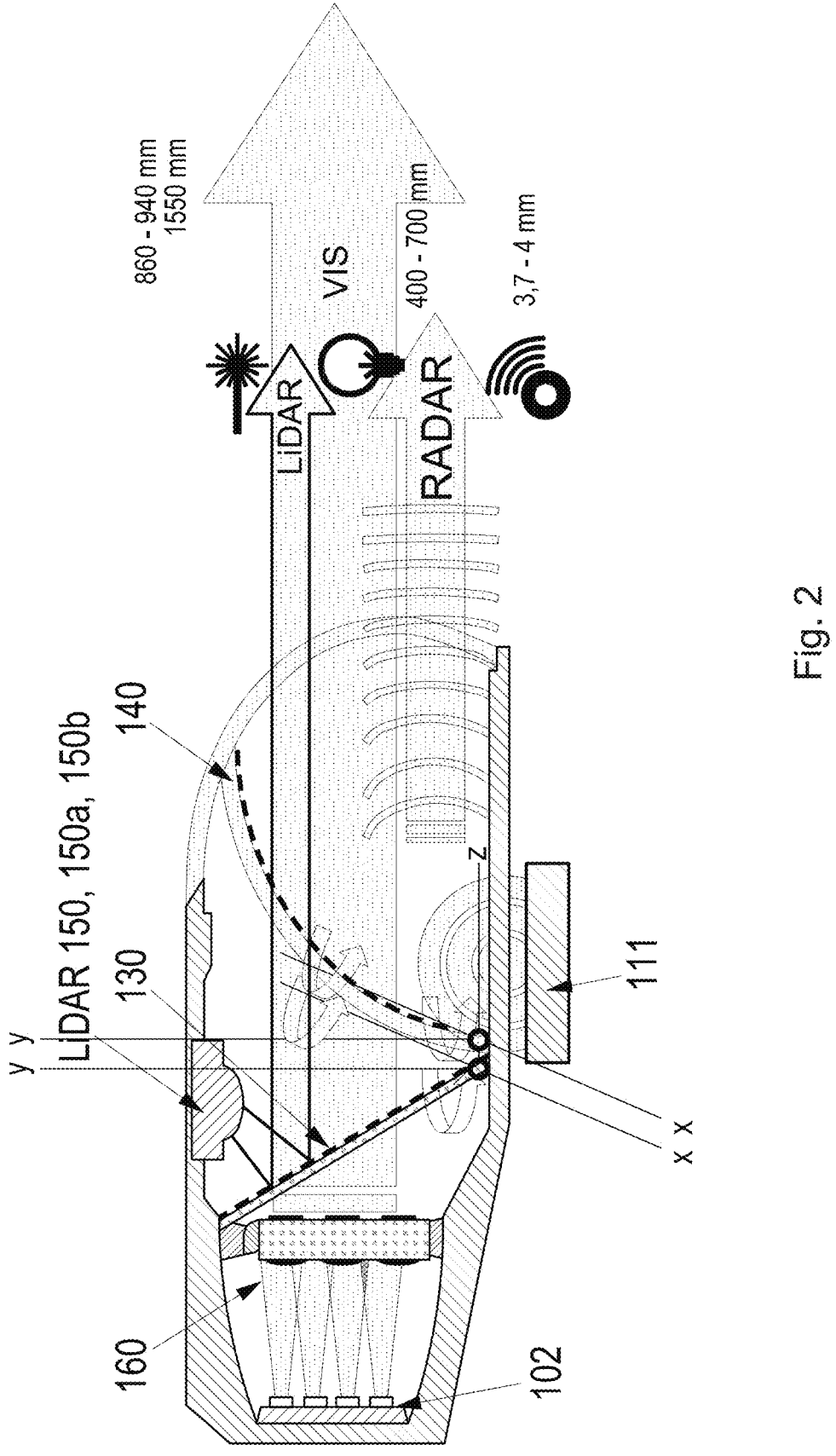
FIG. 2: Schematic side view of a multispectral emission device according to a non-limiting design example.

FIG. 2 shows a schematic side view of the multispectral emission device (110) shown in FIG. 1.

Furthermore, the embodiments according to FIG. 2 show an insert of a micro-optic 160.

Figure 3:
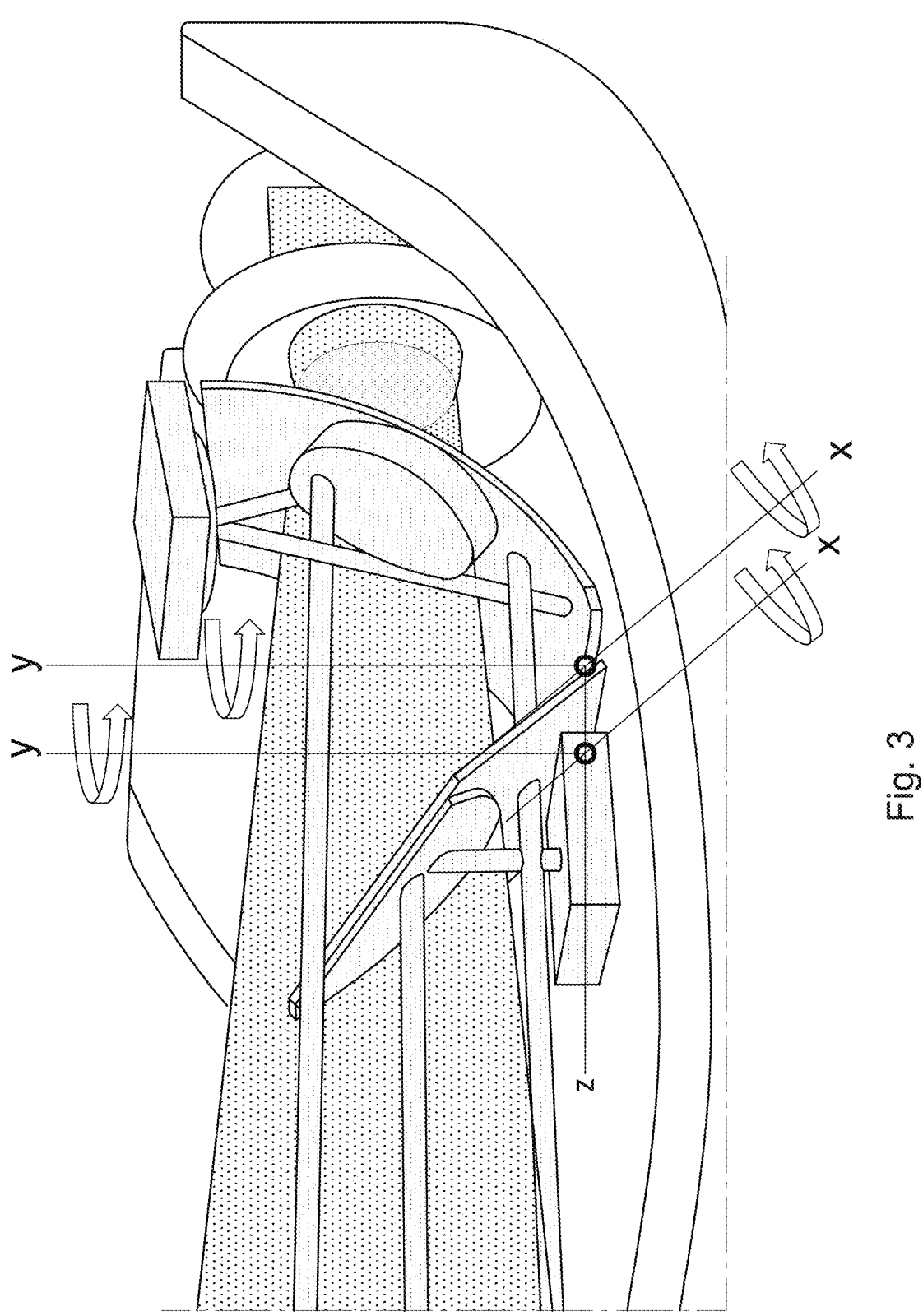
FIG. 3: the multispectral emission device shown in FIG. 1 with representation of the beam path, the emphasized bearing points for a bearing point LiDAR reflector and manipulator and a radar reflector and manipulator.
Figure 4:
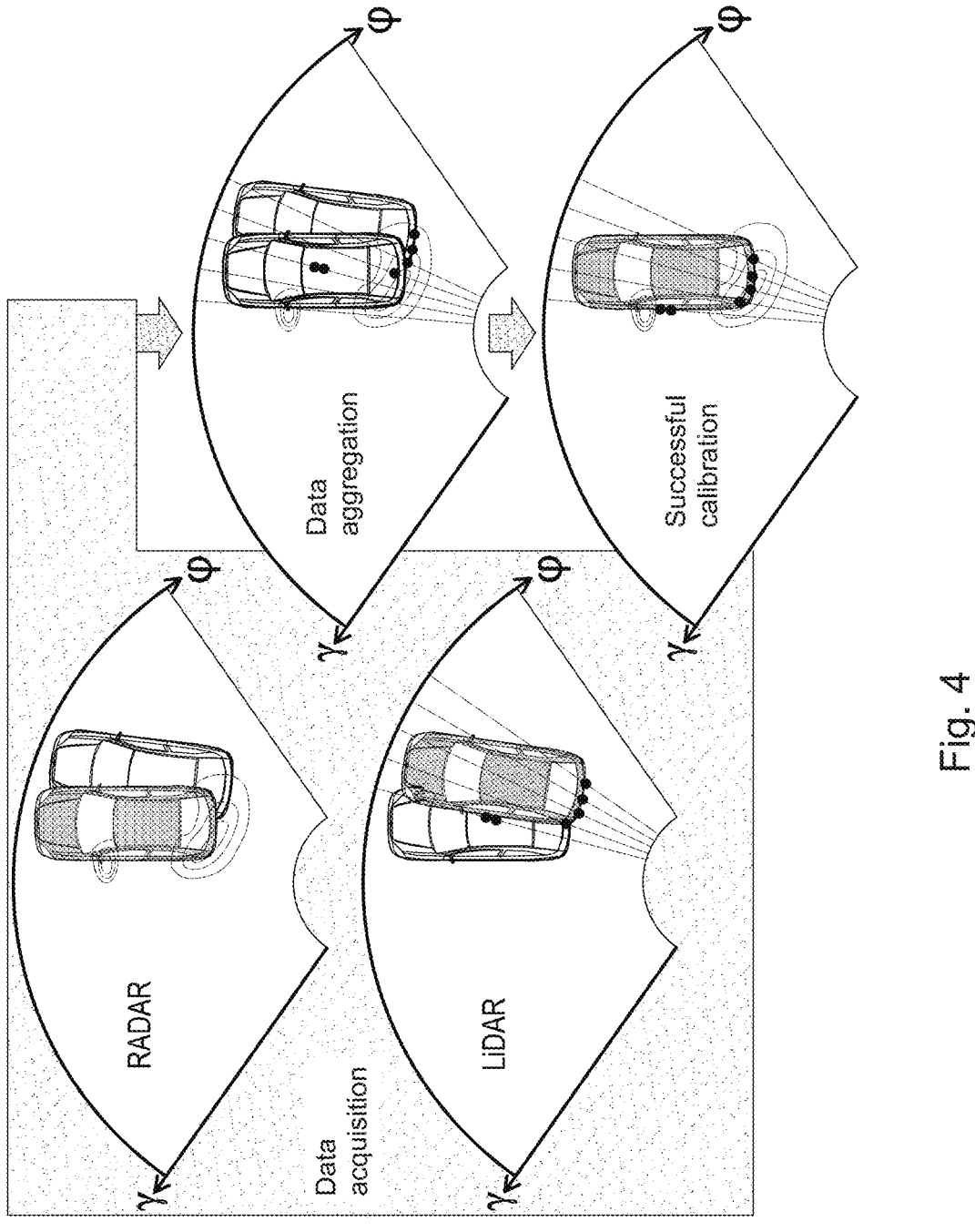
FIG. 4: an aggregation and fusion of radar (iso-lines) and LiDAR measurement data to increase the reliability and robustness of sensor data in ADA systems using a multispectral emission device according to the invention.

FIG. 2 and FIG. 3 show additional movement options at bearing points 135 and 145. These allow focusing of objects at different ranges in the respective direction, determined by the rotational movement, which is accompanied by an increase in the resolution quality of objects. FIG. 4 illustrates the translational movements coupled with the rotational movements.

FIG. 4 shows a coaxial integration of radar and LiDAR in the headlamp using the beam manipulators. This results in the provision of 3D sensors that have a common field of view. The fusion of the sensor measurement data thus allows the detection of road users using different technologies, which significantly increases the reliability and robustness of the driver assistance systems.

The aggregation and fusion of radar (iso-lines) and LiDAR measurement data to increase the reliability and robustness of sensor data in ADA systems using a multispectral emission device according to the invention.

Figure 5:
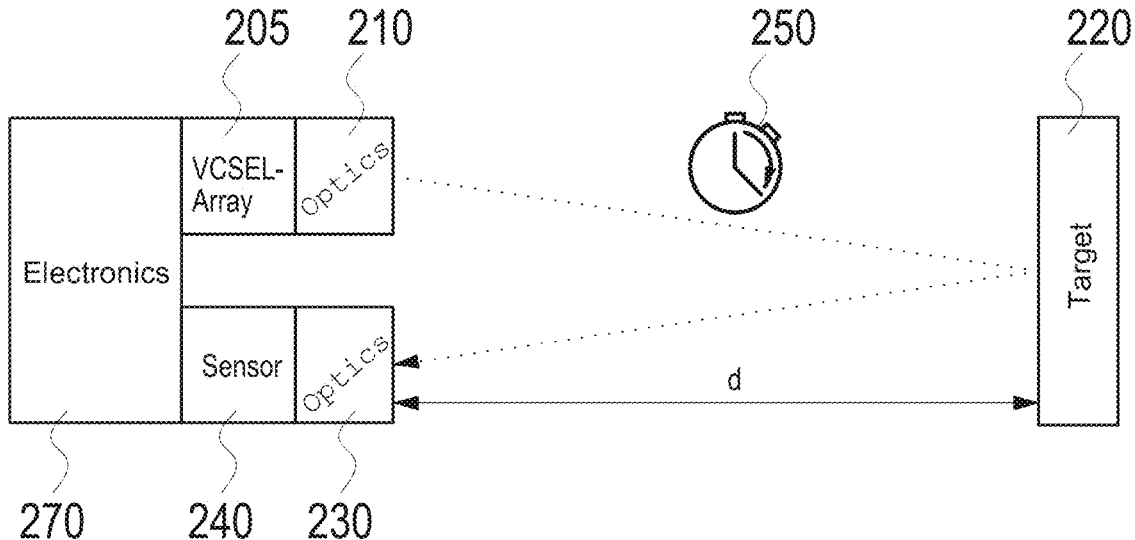
FIG. 5: an operating principle of a LiDAR system for distance measurement with transmitter (light source with transmitting optics, e.g. VCSEL array) with receiver (sensor with receiving optics) as part of a multispectral emission device according to the invention and associated electronic components.

FIG. 5 shows a functional principle of a LiDAR system for distance measurement with transmitter (light source with transmitting optics, e.g. VCSEL array) with receiver (sensor with receiving optics) as part of a multispectral emission device according to the invention and associated electronic components;

Preferably, the headlamp contains a LiDAR system for distance measurement. The LiDAR system consists of a transmitter (light source with transmitting optics, e.g. VCSEL array), a receiver (sensor with receiving optics) and the associated electronics (see FIG. 1). The electronics are used to control the light source, read data from the sensor and process data to distances that can be used for further processing in the vehicle electronics or direct visualization. The light source has a wavelength preferably in the near-infrared range of 800-1550 nm. It is set to any desired pattern using the transmitter optics, e.g. punctiform, linear or planar illumination. Columns in the left or right field of vision can be specifically controlled for cornering, similar to the already established headlight light control. In addition, any individual regions of interest within the field of vision can be illuminated (region of interest, ROI) for fast, more detailed remeasurement. The emitted light is reflected by targets in the vehicle's surroundings and picked up by the receiving optics. A coaxial LiDAR system is possible, in which the same optics are used for both the transmitter and the receiver, or a biaxial system, in which the transmitter and receiver have separate optics. In the case of a flash LiDAR system, the receiver optics are rigid and therefore more robust against mechanical influences. However, care should be taken to ensure that the receiver FoV (field of view) is less than or equal to the transmitter FoV. In the case of a scanning LiDAR system, the entire FoV is scanned according to a specific pattern. The emitted pattern can be realized using VCSEL arrays without moving parts and is therefore more robust against mechanical influences. Otherwise, both the transmitter FoV and the receiver FoV can be controlled using mirrors, which are more susceptible to mechanical influences but allow more precise control. The receiving sensor should only perform data readout and data processing for each illuminated pixel. This more efficient readout allows more measurements for each recorded frame or a higher frame rate.

The beam manipulator 130 includes a LiDAR reflector, which is installed in both the transmit and receive paths of the LiDAR system. The LiDAR reflector reflects in the near-infrared range, but neither in the visible range of the headlamp light nor in the wavelength range of the radar signal. The LiDAR reflector can be either curved for additional beam deflection or planar in shape. For a targeted alignment of the LiDAR FoV, the LiDAR reflector can be aligned by rotation in all three spatial directions, whereby the rotation around the axis along the headlight is only relevant for curved LiDAR reflectors. Therefore, the LiDAR light is best centered on the LiDAR reflector. Accordingly, a translative shift of the LiDAR reflector in all three spatial directions also makes sense. This is also required if the LiDAR reflector is curved in such a way that only a certain orientation is possible. Due to its rotating properties, the LiDAR reflector could be used multifunctionally as a mirror for a 1D or 2D scanning LiDAR system, whereby both resonant and quasi-static operation of the LiDAR reflector alignment is conceivable. Under all arbitrary movements of the LiDAR reflector and therefore almost any angle of incidence, it must still be ensured that the near-infrared range is reflected, while the visible light and the radar wavelength range are transmitted. The individually switchable VCSEL arrays allow the environment to be detected highly selectively.

This LiDAR system is particularly suitable for use in the multispectral emission device (110) according to the invention.

The LiDAR system has a transmitter for LiDAR radiation with a VCSEL array 205 and an optical device 210 for deflecting the radiation. This system is integrated into the multispectral emission device (110) according to the invention in such a way that light pulses from it can hit a target 220 and the light signals reflected from the target 220 can be received by a receiver unit. The receiving unit for the reflected LiDAR radiation preferably has an optical device 230 and a sensor 240.

A measurement process 250 is carried out to measure the time between the emission of a light pulse and its impact on the target 220. Using a conventional time-of-flight analysis, the distance between the transmitter for LiDAR radiation and the target 220 can be determined. The evaluation is carried out via an electronic evaluation unit 270.

A method for manufacturing the multispectral emission device 110, in particular the radiation manipulators 130, 140, is shown below.

The coaxial integration of radar, LiDAR and light in a common headlight poses particular challenges for the optical coatings required for this and their manufacturing technology. The known coating technology of physical vapor deposition (PVD), in particular magnetron sputtering, is further developed according to the invention in such a way that morphological layer properties can be specifically adjusted which enable/favor the laser structurability of the layer system and thus contribute, for example, to the formation of smooth, clean edges of the laser-structured surface topographies in the optimized laser structuring process. In addition, coatings require particularly good adhesion to the substrate material for good laser structuring quality. In the automotive sector, this is usually a polymer for weight reasons. This results in the requirement that the significant differences in the thermal expansion behavior of the brittle-hard, mostly inorganic coating and the polymer substrate must be exceeded by the particularly stable adhesive forces in order to complete the structuring process without the coating adhesion failing.

Laser structuring is primarily used to manipulate radar waves by producing Fresnel zone optics, preferably on transparent conductive oxide layers (e.g. AZO, ITO, . . . ) or thin metal layers (e.g. Ag, . . . ). The challenge for the radar-optically effective coating lies solely in the combination of the conductivity of the layer and its required optical transparency of ≥85% in the visible spectral range.

In the application of coaxial integration of radar, LiDAR and light in a common headlamp described here, however, this requirement must be extended to all optical layers in the system: the conductive layers for radar beam deflection must be combined in multilayer systems with additional dielectric optical materials in order to guarantee the required spectral properties of all sensor systems involved and the lighting equally in the coaxial beam path. This results in the requirement to develop multilayer designs at several positions in the beam manipulator beam path, which enable the transmission of the vehicle lighting in the VIS, the reflection or transmission of the LiDAR wavelengths as well as the optical manipulation of the radar beam path. This results in a decisive innovation for the optical coating: by embedding the radar-optically effective conductive layers in other dielectric materials to combine all these requirements, the optical multilayer systems must now have overall favorable properties for laser structuring, no longer "only" the radar-effective conductive layers.

Optical multilayer systems are used to achieve the radiation-manipulating properties of the radiation manipulators 130, 140 in particular. These consist of alternating layers of two or more layer materials, which should have a suitable—usually as significant as possible—difference in their refractive indices. By alternating thin layers of suitable individual layer thicknesses, layer stacks can be created that specifically influence the spectral distribution of the transmitted and reflected light. The aim of this creative optimization of such multilayer systems is to adjust the constructive or destructive interference of the light waves in the specially used wavelength ranges. Depending on the application, this can be, for example, a reflector (=constructive interference in reflection→reduced transmission), an anti-reflective system (destructive interference in reflection→increased transmission) or an optical filter with, for example, a band or edge filter function for certain wavelength ranges.

Particularly suitable materials are, for example, $SiO2$ and $ZrO2$, $TiO2$, $Ta2O5$, $Nb2O5$ or $Si3N4$, which are preferably applied alternately to a carrier substrate and thus have customized radiation-manipulating properties including anti-reflective systems.

Figure 6:
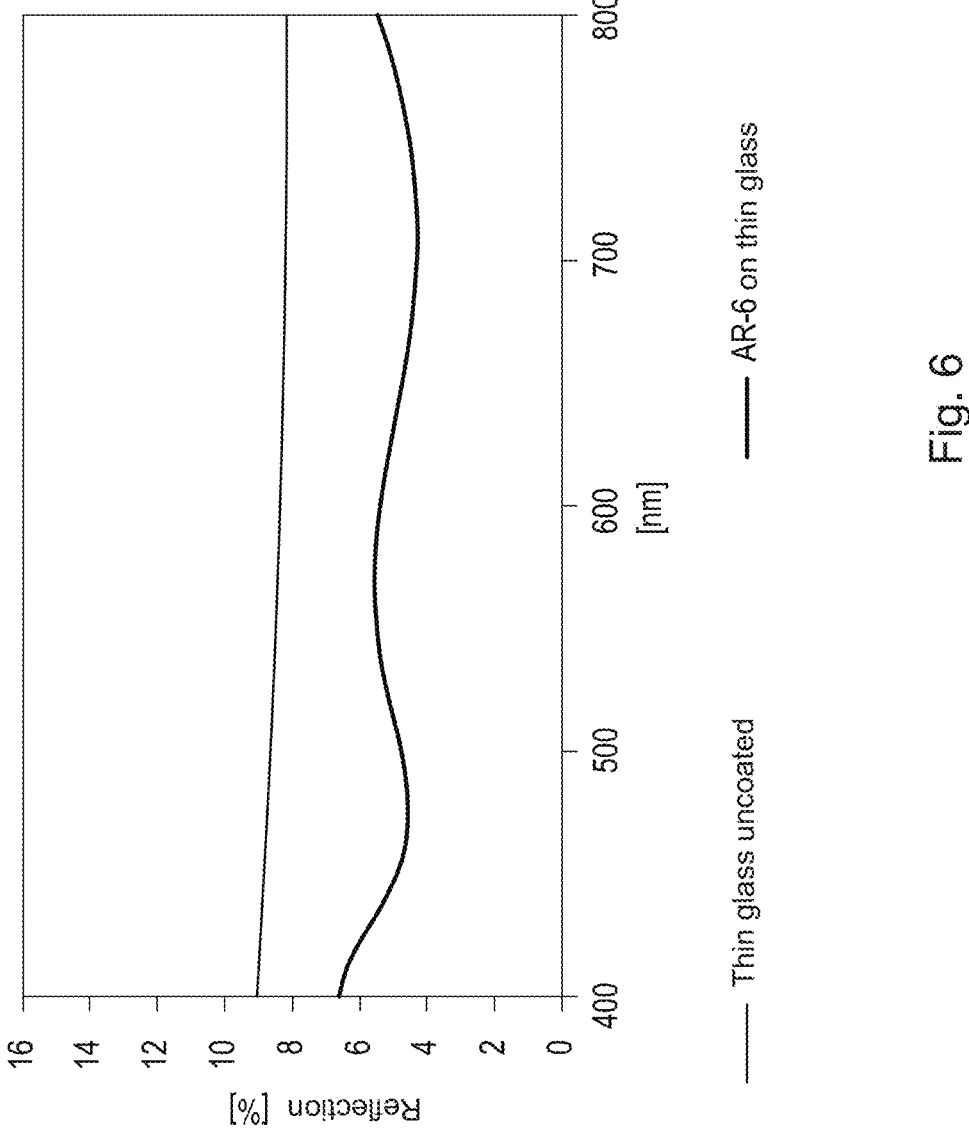
FIG. 6: an illustration of a resulting reduction in spectral reflection using a suitable one-sided coating.

FIG. 6 shows, for example, an illustration of a resulting reduction in spectral reflection using a suitable one-sided coating, whereby there is a significant reduction in reflection in a broad wavelength range.

Another special requirement for the optical coating is the particularly large optical bandwidth: Due to the different wavelength ranges in which radar and LiDAR are manipulated and the vehicle lighting in the visible spectral range must be transmitted almost loss-free and without color shift through the entire coaxial system, there is an optical specification for the entire wavelength range between 400 nm and 4 mm, i.e. over 4 orders of magnitude.

In addition, the optical multilayer systems guarantee their spectral performance for radar, LiDAR and illumination over particularly oblique angles of incidence and wide angular ranges. This complicates the new optical multilayer designs to be developed, e.g. increases the number of layers required, and thus competes with the requirements for ensuring good laser structurability.

The combination of all these requirements in a laser-structurable multilayer coating system for the coaxial beam path is new in the field of optical coating design and manufacture.

Figure 7:
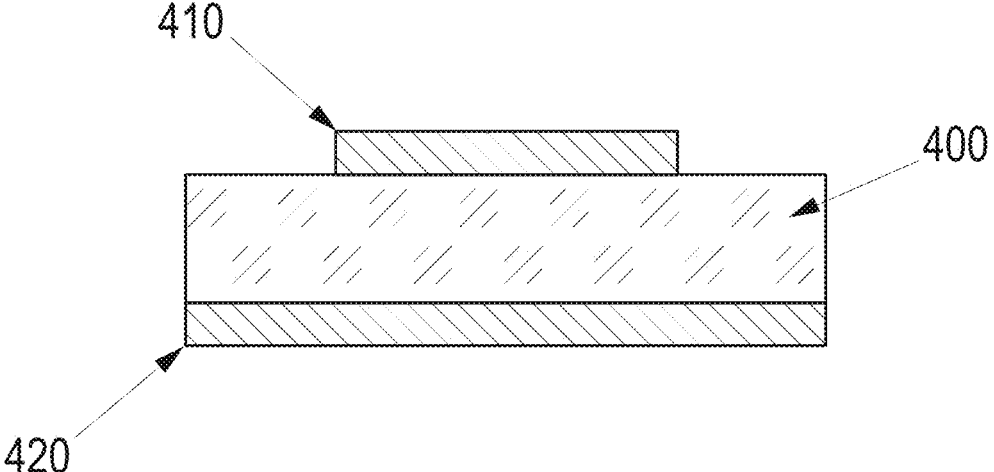
FIG. 7: A schematic representation of a phase-shifting structure suitable for phase control of an incident wave.

FIG. 7 shows a schematic diagram of a phase-shifting structure suitable for phase control of an incident wave, comprising a substrate 400 and a conductive structure 410 applied to one surface of the substrate 400 and a conductive ground plane 420 applied to another surface of the substrate 400.

Figure 8:
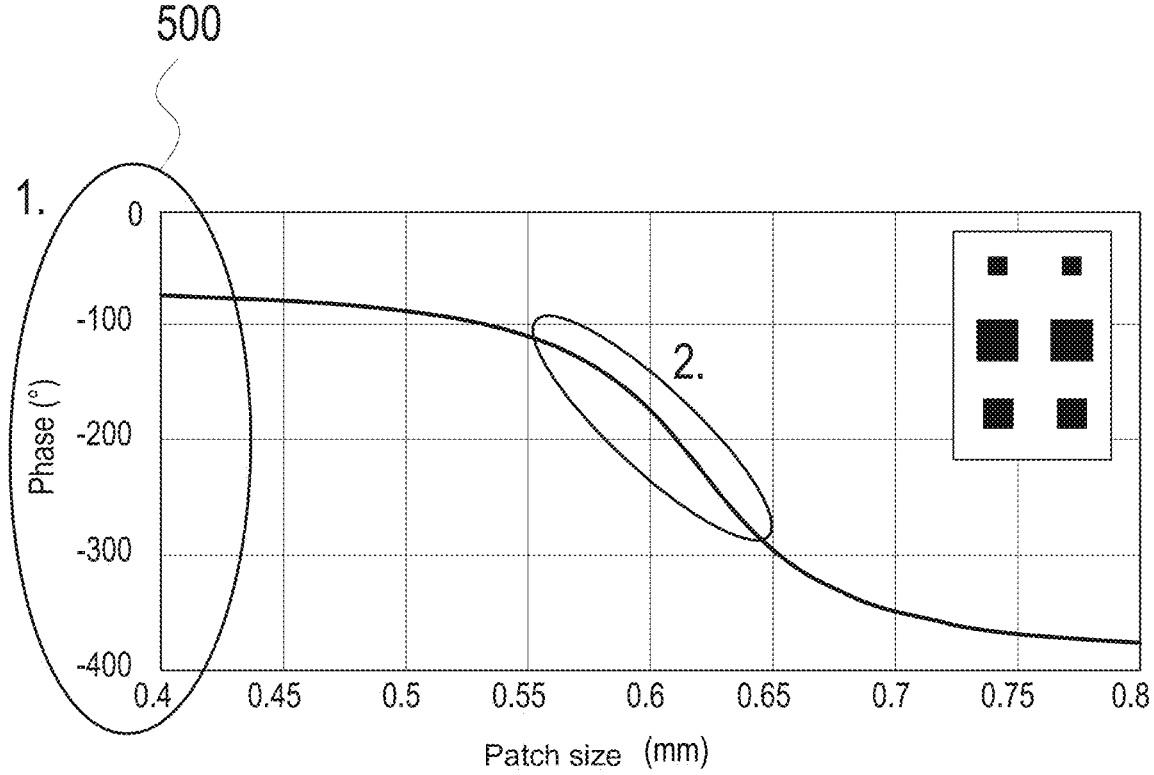
FIG. 8: is a diagram showing the dependence of the phase on the patch size in mm.

FIG. 8 shows a diagram of the dependence of a phase 500 on the patch size in mm.

Requirements to be met are preferably:

Phase control of the incident wave by means of phase-shifting structures

Reflective: patches, circles, crosses, . . .

Diffractive: Stripes, rings, . . .

Challenges:

Coverage of the entire phase angle range (0°-360°)

Avoidance of dependence of the structural dimensions on excessive phase variation (manufacturing tolerances!)

Low phase variation in the frequency range 76-81 GHz.

Figure 9:
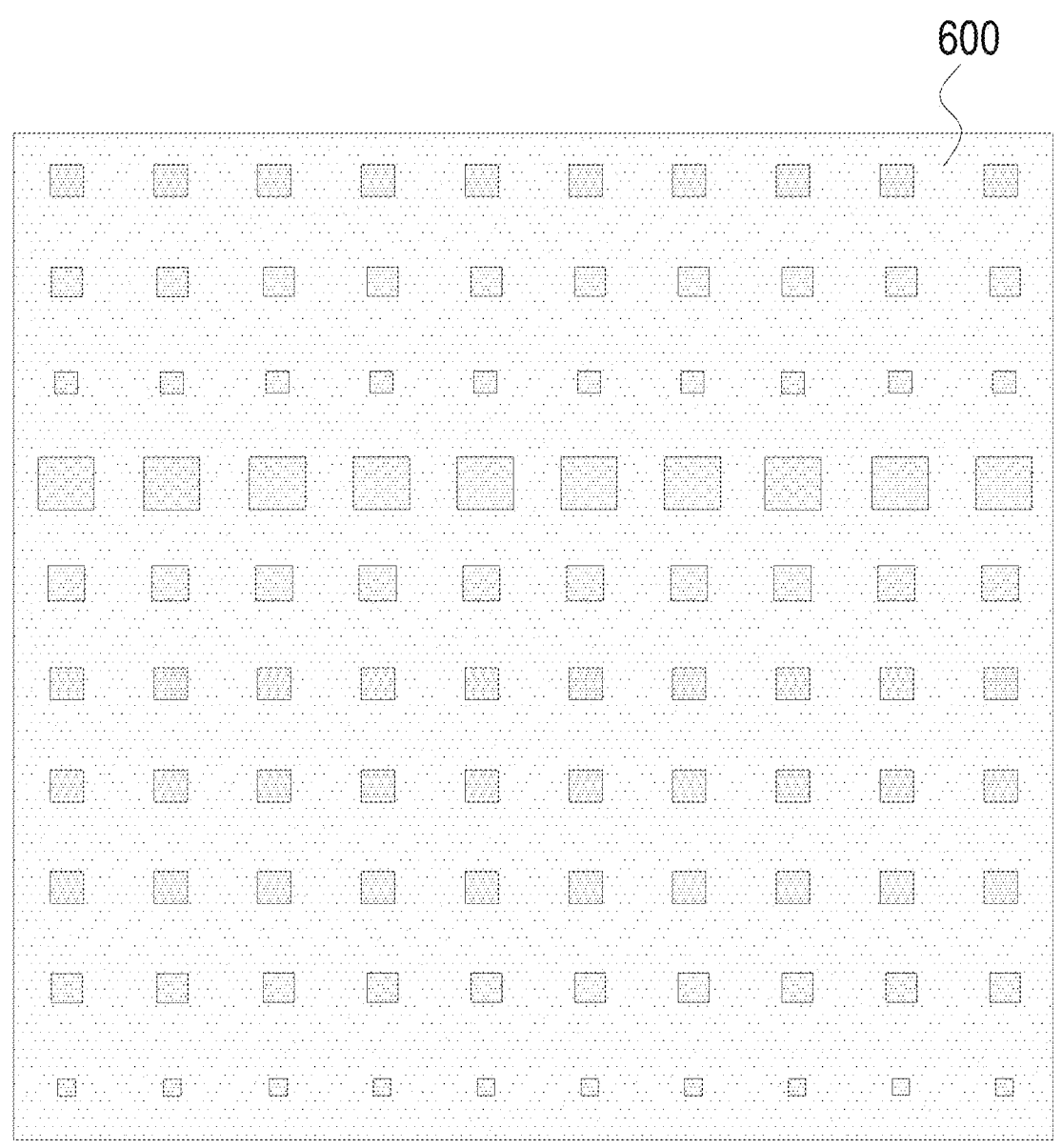
FIG. 9: a reflectarray according to the invention.

FIG. 9 shows a reflectarray 600 according to the invention with patch sizes adapted to the desired phase positions. This reflectarray 600 is a non-limiting embodiment of a radiation-manipulating device. It is preferably a printed circuit board-like structure with a transparent substrate in the center and conductive, transparent structured coating on the outer sides. Squares (patches) are structured on the upper side, while the underside is conductive throughout (ground plane). Measurements have shown that a 90° deflection of the wave is possible even though the reflector/radiation manipulator is positioned at 56.8°. This is possible because each patch adds a previously calculated phase shift to the radar beam, resulting in a 90° reflection. Due to the transparency, light and LiDAR can pass through the structure.

Figure 10:
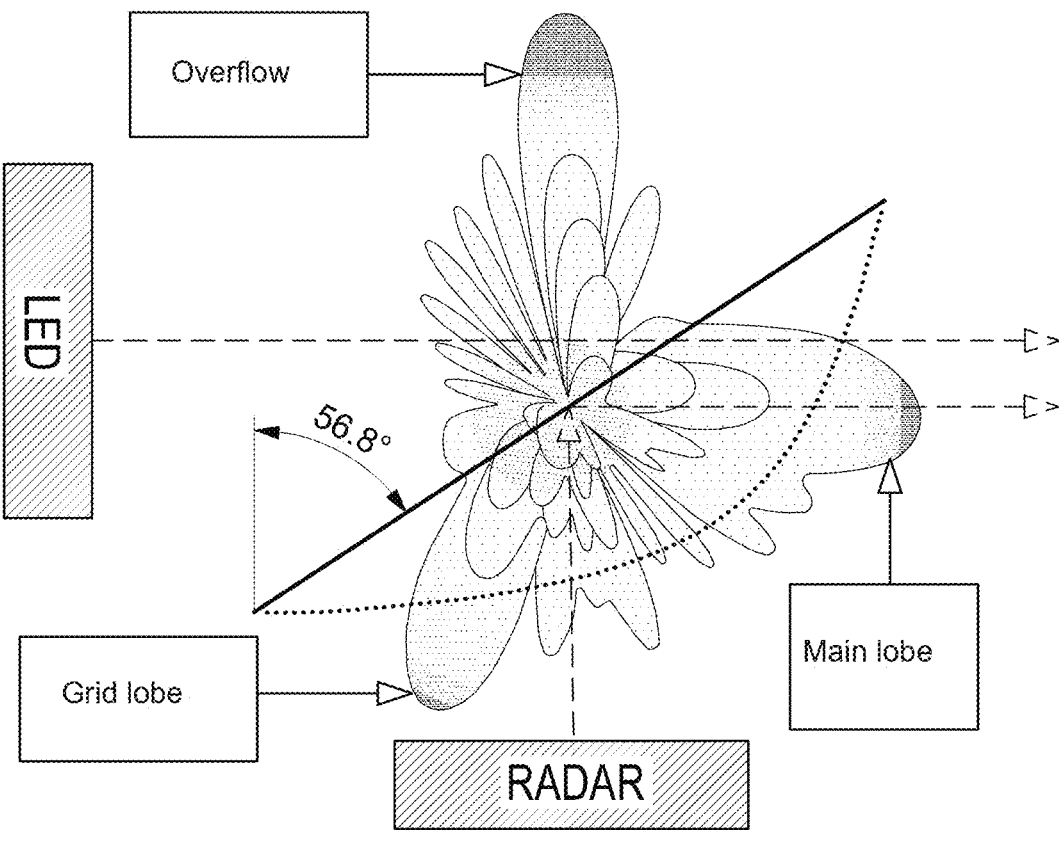
FIG. 10: is a schematic representation of the deflection of electromagnetic waves by the array shown in FIG. 9.

FIG. 10 shows a schematic representation of the deflection of electromagnetic waves by the array shown in FIG. 9.

The beam path 19 of the propagating radar radiation or RF wave emitted by the radar module 12 initially runs transversely to the direction of radiation x, in particular at least approximately orthogonally thereto and/or at least approximately in the vertical direction, and is then deflected by approximately 90° by means of the radiation manipulator for LiDAR radiation, or in particular for radar radiation 13, whereby a detection area 8 is defined by means of the radiation manipulator for LiDAR radiation, or in particular for radar radiation and/or by means of a respective radiation deflection structure 13, 140. 90° by means of the radiation manipulator for LiDAR radiation, or in particular for radar radiation and/or by means of a respective radiation deflection structure 13, 140, whereby a detection area 8 is defined.

The arrow z in FIG. 1 indicates the direction of radiation (direction of emission) or the corresponding longitudinal position of a respective component in the direction of radiation, whereby the respective longitudinal position is detected, for example, starting from the light source. The radar module and the radiation manipulator for LiDAR radiation or for radar radiation and optionally also the antenna unit are arranged in at least approximately the same longitudinal position z. The headlamp cover 104 extends rearwards (to the rear) to a longitudinal position smaller than the longitudinal position of the radar module and the radiation manipulator for LiDAR radiation or for radar radiation. In other words, the headlight cover not only overlaps the radar module and the radiation manipulator for LiDAR radiation or for radar radiation, but also completely covers these two components in the direction of radiation.

The invention claimed is:

1. A multispectral emission device set up for emitting electromagnetic radiation for detecting at least reflected radar radiation, having:
   a headlight with a light-transparent headlight cover and a light source arranged behind the headlight cover for emitting visible light as headlight light;
   a radar module with a radar antenna unit arranged behind the headlight cover and integrated in the headlight, wherein the multispectral emission device has at least one radiation-manipulating device in the form of a frequency selective radiation deflection structure, wherein
   the multispectral emission device further comprises at least one transmitting unit for LiDAR radiation and one receiving unit for LiDAR radiation and at least two radiation manipulators, wherein one of the radiation manipulators is a LiDAR radiation manipulating device and at least one radiation manipulator is a radar radiation manipulating device,
   wherein the LiDAR radiation manipulating device and the transmitting unit for LiDAR radiation are arranged such that the LiDAR radiation manipulating device redirects LiDAR radiation emitted by the transmitting unit for LiDAR radiation and the LiDAR radiation manipulating device is arranged such that LiDAR radiation emitted by the transmitting unit for LiDAR radiation is redirected to the receiving unit for LiDAR radiation,
   wherein LiDAR radiation passing from outside through the headlight cover is guided to the receiving unit for LiDAR radiation and the radar radiation manipulating device is arranged such that radar radiation passing from the outside through the headlight cover is guided to a receiving unit for radar radiation, and
   wherein the transmitting unit for LiDAR radiation, the LiDAR radiation manipulating device, the radar module, and the radar radiation manipulating device are arranged such that at least one radiation cone of redirected LiDAR radiation and at least one radiation cone of redirected radar radiation are aligned.

2. The multispectral emission device according to claim 1, wherein a combination of wavelengths over 4 orders of magnitude (400 nm to 4 mm) takes place.

3. The multispectral emission device according to claim 1, wherein the at least one radiation cone of the redirected LiDAR radiation, the at least one radiation cone of the redirected radar radiation, and a radiation cone of the light source of the headlight run parallel to one another and/or coaxially and/or overlapping.

4. The multispectral emission device according to claim 3, wherein a radiation cone of the light source of the headlight also runs coaxially to radiation cones of the LiDAR and radar radiation.

5. The multispectral emission device according to claim 1, wherein the LiDAR radiation manipulating device is configured such that LiDAR radiation emitted by the transmitter unit for LiDAR radiation is redirected such that at least one further radiation cone for redirected LiDAR radiation is formed,
   wherein at least one further receiver unit for LiDAR radiation is provided, and
   wherein the at least one further receiving unit for LiDAR radiation is arranged such that further LiDAR radiation passing through the headlight cover from outside is guided to the at least one further receiving unit for LiDAR radiation.

6. The multispectral emission device according to claim 1, wherein the radar radiation manipulating device is configured such that radar radiation emitted by the radar module is redirected such that at least one further radiation cone for redirected radar radiation is formed,
   at least one further receiving unit for radar radiation is provided, and
   the at least one further receiving unit for radar radiation is arranged such that further radar radiation passing through the headlight cover from outside is guided to the at least one further receiving unit for radar radiation.

7. The multispectral emission device according to claim 1, wherein at least one of the radiation manipulators is mounted in a translatory manner.

8. The multispectral emission device according to claim 1, wherein a structure pattern has been introduced into the radiation manipulator by thin-film ablation or thin-film application, or wherein the radiation manipulator has been produced by thin-film ablation or thin-film application or by application of a film.

9. A method of manufacturing a multispectral emission device according to claim 1, the method comprising:
   forming the at least one radar radiation manipulating device in the form of the frequency-selective radiation deflection structure, wherein the at least one radar radiation manipulating device has a conductive part in the form of a light-transparent, electrically conductive layer or is at least partially formed thereby;
   introducing a structural pattern for generating a targeted reflection of the radar wavelengths into the radar radiation manipulating device by thin-film ablation with a laser; and
   forming the at least one LiDAR radiation-manipulating device in the form of a frequency-selective radiation deflection structure, wherein the at least one LiDAR radiation manipulating device has a conductive part in the form of a light-transparent, electrically conductive layer or is at least partially formed thereby.

10. A method of operating a multispectral emission device according to claim 1, the method comprising:

emitting headlight light radiation in the form of a light cone and emitting LiDAR radiation in the form of a primary LiDAR signal as bundled electromagnetic radiation in a LiDAR radiation cone;

emitting radar radiation in the form of a primary radar signal as bundled electromagnetic radiation in a radar radiation cone, wherein the headlight radiation cone, the LiDAR radiation cone, and the radar radiation cone run parallel and coaxially and/or overlap with one another;

detecting and analyzing secondary LiDAR signals reflected by at least one object and secondary radar signals reflected by the object; and obtaining individual, several, or all of the following information from the analysis:

an angle or a direction to the object a distance to the object (from the time difference between sending and receiving)

a relative movement between the multispectral emission device and the object, wherein the parallelism and coaxiality of the LiDAR radiation cone and the radar radiation cone are taken into account in the analysis.

11. The method according to claim 10, wherein at least one further LiDAR radiation cone and/or one further radar radiation cone is emitted so that the object is detected with angular resolution.

12. The method according to claim 10, wherein wavelength-selective structures are used which bring about an influencing of sensor-specific spectral ranges and thus a reduction of thermal effects due to undesired absorption.

13. The method according to claim 12, wherein the multispectral emission device is connected to a control unit, wherein the control unit controls the radiation manipulators during operation of the multispectral emission device such that the radiation manipulators are each rotated independently of one another about at least one axis, so that FOVs of LiDAR radiation and radar radiation are set independently of each other by the separate rotation of the at least two radiation manipulators and the separate rotation of the radiation manipulators is used in real time to increase the detection accuracy of objects.

14. A vehicle comprising:

the multispectral emission device according to claim 1; and a unit for a fusion of sensor measurement data for radar and LiDAR.

15. The vehicle according to claim 14, further comprising a control unit, the control unit being adapted to control the radiation manipulators during operation of the multispectral emission device so that the radiation manipulators can be rotated independently of each other about at least one of axis, so that FOVs of LiDAR radiation and radar radiation are set independently of each other by the separate rotation of the at least two radiation manipulators and the separate rotation of the radiation manipulators is used to increase detection accuracy of objects.

16. A multispectral emission device set up for emitting electromagnetic radiation for detecting at least reflected radar radiation, having:

a headlight with a light-transparent headlight cover and a light source arranged behind the headlight cover for emitting visible light as headlight light;

a radar module with a radar antenna unit arranged behind the headlight cover and integrated in the headlight, wherein the multispectral emission device has at least one radiation-manipulating device, wherein the multispectral emission device further comprises at least one transmitting unit for LiDAR radiation and one receiving unit for LiDAR radiation and at least two radiation manipulators, wherein one of the radiation manipulators is a LIDAR radiation manipulating device and at least one radiation manipulator is a radar radiation manipulating device, wherein the LiDAR radiation manipulating device and the transmitting unit for LIDAR radiation are arranged such that the LIDAR radiation manipulating device redirects LIDAR radiation emitted by the transmitting unit for LiDAR radiation and the LIDAR radiation manipulating device is arranged such that LIDAR radiation emitted by the transmitting unit for LIDAR radiation is redirected to the receiving unit for LiDAR radiation, wherein LIDAR radiation passing from outside through the headlight cover is guided to the receiving unit for LIDAR radiation and the radar radiation manipulating device is arranged such that radar radiation passing from the outside through the headlight cover is guided to a receiving unit for radar radiation, wherein the transmitting unit for LIDAR radiation, the LIDAR radiation manipulating device, the radar module, and the radar radiation manipulating device are arranged such that at least one radiation cone of redirected LIDAR radiation and at least one radiation cone of redirected radar radiation are aligned, and wherein the at least one radiation cone of the redirected LiDAR radiation and the at least one radiation cone of the redirected radar radiation can additionally overlap.

17. A multispectral emission device set up for emitting electromagnetic radiation for detecting at least reflected radar radiation, having;

headlight with a light-transparent headlight cover and a light source arranged behind the headlight cover for emitting visible light as headlight light;

a radar module with a radar antenna unit arranged behind the headlight cover and integrated in the headlight, wherein the multispectral emission device has at least one radiation-manipulating device, wherein the multispectral emission device further comprises at least one transmitting unit for LiDAR radiation and one receiving unit for LiDAR radiation and at least two radiation manipulators, wherein one of the radiation manipulators is a LIDAR radiation manipulating device and at least one radiation manipulator is a radar radiation manipulating device, wherein the LIDAR radiation manipulating device and the transmitting unit for LIDAR radiation are arranged such that the LiDAR radiation manipulating device redirects LIDAR radiation emitted by the transmitting unit for LIDAR radiation and the LIDAR radiation manipulating device is arranged such that LIDAR radiation emitted by the transmitting unit for LIDAR radiation is redirected to the receiving unit for LiDAR radiation, wherein LIDAR radiation passing from outside through the headlight cover is guided to the receiving unit for LIDAR radiation and the radar radiation manipulating device is arranged such that radar radiation passing from the outside through the headlight cover is guided to a receiving unit for radar radiation, wherein the transmitting unit for LiDAR radiation, the LIDAR radiation manipulating device, the radar module, and the radar radiation manipulating device are arranged such that at least one radiation cone of redirected LIDAR radiation and at least one radiation come of redirected radar radiation are aligned, and wherein at least one of the radiation manipulators is rotatably mounted about at least one axis.

18. The multispectral emission device according to claim 17, wherein at least one of the radiation manipulators is rotatably mounted about a z-axis during assembly of the multispectral emission device.

19. The multispectral emission device according to claim 17, wherein at least one of the radiation manipulators is rotatably mounted about a y-axis during operation of the multispectral emission device to set a horizontal field of view (FOV).

20. The multispectral emission device according to claim 17, wherein at least one of the radiation manipulators is rotatably mounted about an x-axis during operation of the multispectral emission device to set a vertical FOV.

21. The multispectral emission device according to claim 17, wherein the at least two radiation manipulators are each rotated independently of one another about at least one of the at least one axis during operation of the multispectral emission device, so that FOVs of the LiDAR radiation and the radar radiation can be set independently of one another by rotating the at least two radiation manipulators separately.

22. The multispectral emission device according to claim 21, wherein the multispectral emission device is connectable to a control unit, the control unit being arranged to control the radiation manipulators during operation of the multispectral emission device so that the radiation manipulators can each be rotated independently of one another about at least one of the at least one axis, so that FOVs of the LiDAR radiation and the radar radiation are set independently of each other by separate rotation of the at least two radiation manipulators and the separate rotation of the radiation manipulators is used to increase detection accuracy of objects.

23. A multispectral emission device set up for emitting electromagnetic radiation for detecting at least reflected radar radiation, having:

a headlight with a light-transparent headlight cover and a light source arranged behind the headlight cover for emitting visible light as headlight light;

a radar module with a radar antenna unit arranged behind the headlight cover and integrated in the headlight, wherein the multispectral emission device has at least one radiation-manipulating device, wherein the multispectral emission device further comprises at least one transmitting unit for LiDAR radiation and one receiving unit for LiDAR radiation and at least two radiation manipulators, wherein one of the radiation manipulators is a LIDAR radiation manipulating device and at least one radiation manipulator is a radar radiation manipulating device, wherein the LIDAR radiation manipulating device and the transmitting unit for LiDAR radiation are arranged such that the LiDAR radiation manipulating device redirects LiDAR radiation emitted by the transmitting unit for LiDAR radiation and the LIDAR radiation manipulating device is arranged such that LIDAR radiation emitted by the transmitting unit for LiDAR radiation is redirected to the receiving unit for LiDAR radiation, wherein LIDAR radiation passing from outside through the headlight cover is guided to the receiving unit for LIDAR radiation and the radar radiation manipulating device is arranged such that radar radiation passing from the outside through the headlight cover is guided to a receiving unit for radar radiation, wherein the transmitting unit for LiDAR radiation, the LIDAR radiation manipulating device, the radar module, and the radar radiation manipulating device are arranged such that at least one radiation cone of redirected LIDAR radiation and at least one radiation cone of redirected radar radiation are aligned, and wherein the transmitting unit for LiDAR radiation is thermally insulated, so that a temperature-dependent wavelength drift of the LiDAR transmitting unit is avoided.

\* \* \* \* \*